US012545241B2

(12) United States Patent
Okabe et al.

(10) Patent No.: US 12,545,241 B2
(45) Date of Patent: Feb. 10, 2026

(54) DRIVING ASSISTANCE APPARATUS AND DRIVING ASSISTANCE METHOD

(71) Applicant: Panasonic Automotive Systems Co., Ltd., Kanagawa (JP)

(72) Inventors: Yoshimasa Okabe, Kanagawa (JP); Masayoshi Michiguchi, Kanagawa (JP); Yudai Ishibashi, Kanagawa (JP); Kantaro Matsuyama, Tokyo (JP); Yusuke Tsuji, Kanagawa (JP); Hirotaka Nagaoka, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 96 days.

(21) Appl. No.: 18/614,213

(22) Filed: Mar. 22, 2024

(65) Prior Publication Data

US 2024/0317215 A1    Sep. 26, 2024

(30) Foreign Application Priority Data

Mar. 23, 2023  (JP) ................................. 2023-046961

(51) Int. Cl.
*B60Q 1/48* (2006.01)
*B60R 1/22* (2022.01)
(Continued)

(52) U.S. Cl.
CPC ............... *B60W 30/06* (2013.01); *B60R 1/22* (2022.01); *B60W 50/14* (2013.01);
(Continued)

(58) Field of Classification Search
CPC ................ B60W 30/06; B60W 50/14; B60W 2050/146; B60W 2420/403;
(Continued)

(56) References Cited

U.S. PATENT DOCUMENTS 11,117,520 B2 *   9/2021   Shimizu ................... H04N 7/18
12,228,681 B2 *   2/2025   Kondo ..................... G01S 7/411
(Continued)

FOREIGN PATENT DOCUMENTS

JP         2018-148314         9/2018
JP         2018-180941         11/2018
(Continued)

*Primary Examiner* — Toan N Pham
(74) *Attorney, Agent, or Firm* — GREENBLUM & BERNSTEIN, P.L.C

(57) ABSTRACT

Provided is a driving assistance apparatus that makes it possible to correctly estimate an inclination angle of a slope inclined in any direction and perform more accurate automatic parking by performing inclination direction estimation in which an inclination direction is estimated by analyzing a movement amount of a feature point on an image caused by traveling and then performing inclination angle estimation. The driving assistance apparatus includes an inclination detector that detects an inclination direction of a slope or a road surface around a vehicle on the basis of a camera image showing surroundings of the vehicle taken by a camera mounted on the vehicle, and assists driving of the vehicle on the basis of the inclination direction.

18 Claims, 23 Drawing Sheets

(51) Int. Cl.
 *B60W 30/06* (2006.01)
 *B60W 50/14* (2020.01)
 *G06V 20/56* (2022.01)
(52) U.S. Cl.
 CPC ...... *G06V 20/588* (2022.01); *B60R 2300/305* (2013.01); *B60R 2300/607* (2013.01); *B60R 2300/806* (2013.01); *B60W 2050/146* (2013.01); *B60W 2420/403* (2013.01); *B60W 2552/15* (2020.02)
(58) Field of Classification Search
 CPC ................ B60W 2552/15; B60R 1/22; B60R 2300/305; B60R 2300/607; B60R 2300/806; B60R 1/27; G06V 20/588; G06V 20/586
 See application file for complete search history.

(56) References Cited

U.S. PATENT DOCUMENTS

| | | | |
|---|---|---|---|
| 2015/0049913 A1* | 2/2015 | Zhong | G06T 7/593 |
| | | | 382/104 |
| 2016/0088260 A1* | 3/2016 | Fujio | H04N 7/181 |
| | | | 348/148 |
| 2016/0307051 A1* | 10/2016 | Nishijima | G06T 7/70 |
| 2018/0093619 A1* | 4/2018 | Han | B60R 1/31 |
| 2018/0255274 A1 | 9/2018 | Arase | |
| 2022/0189065 A1 | 6/2022 | Kawabe et al. | |

FOREIGN PATENT DOCUMENTS

| | | |
|---|---|---|
| JP | 2019-139273 | 8/2019 |
| JP | 2020-154742 | 9/2020 |

* cited by examiner

DRIVING ASSISTANCE APPARATUS AND DRIVING ASSISTANCE METHOD

TECHNICAL FIELD

The present disclosure relates to a driving assistance apparatus and a driving assistance method for detecting an inclination of a road surface in the middle of a parking path.

BACKGROUND ART

Recently, a technique in which an environment around a vehicle is detected by an in-vehicle sensor and the vehicle is automatically parked, for example, in a parking space surrounded by a white line is known. Patent Literature 1 proposes a method for estimating an inclination angle of a slope from an angle of a parking frame line on an overhead image in a case where an inclination direction of the slope (in other words, a direction orthogonal to a contour line) is orthogonal to a vehicle and the parking frame line is drawn on the slope.

CITATION LIST

Patent Literature

PTL 1
Japanese Patent Application Laid-Open No. 2018-180941

SUMMARY OF INVENTION

Technical Problem

However, according to the method of Patent Literature 1, the inclination angle is estimated on the assumption that the inclination direction of the slope is orthogonal to the vehicle. Therefore, in a case where the vehicle is not orthogonal to the inclination direction of the slope, the inclination angle cannot be correctly estimated, and the inclination direction of the slope with respect to the vehicle cannot be estimated for the same reason.

Furthermore, since the inclination angle is estimated on the assumption that the parking frame line is drawn on the slope, the inclination angle cannot be estimated even in a case where the inclination direction is orthogonal to the vehicle, unless the parking frame line is drawn on the slope.

The present disclosure was accomplished in view of such problems, and an object of the present disclosure is to provide a driving assistance apparatus that can correctly estimate an inclination angle of a slope inclined in any direction and perform automatic parking more accurately.

Solution to Problem

In order to solve the problems described above, a driving assistance apparatus according to one aspect of the present disclosure includes: an inclination detector that detects an inclination direction of a slope or a road surface around a vehicle based on a camera image of surroundings of the vehicle taken by a camera mounted on the vehicle, in which driving of the vehicle is assisted based on the inclination direction.

Further, a driving assistance method according to one aspect of the present disclosure includes: imaging surroundings of a vehicle by using a camera mounted on the vehicle; detecting an inclination direction of a slope or a road surface around the vehicle by using an inclination detector; and assisting driving of the vehicle based on the inclination direction.

Advantageous Effects of Invention

According to the present disclosure, it is possible to correctly estimate an inclination angle of a slope inclined in any direction and achieve automatic parking more accurately.

DESCRIPTION OF EMBODIMENTS

Figure 1A:
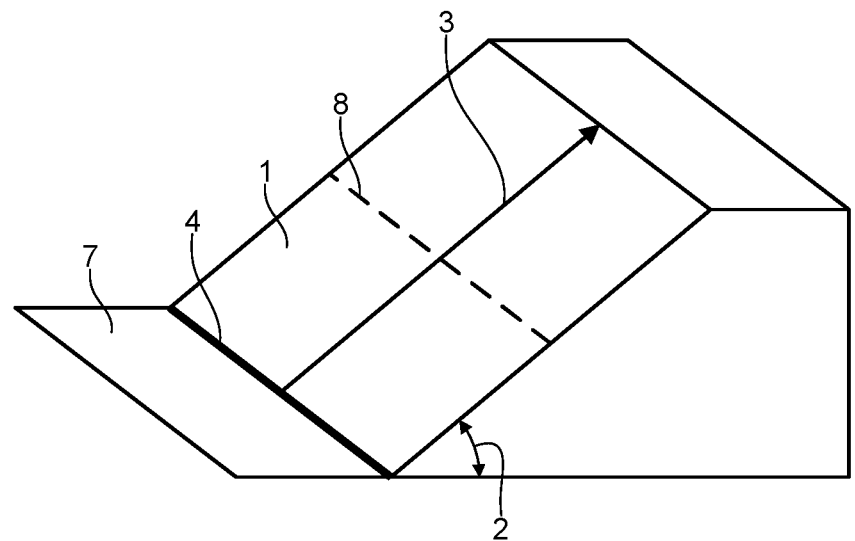
FIG. 1A is a perspective view illustrating a slope in the present embodiment.

An embodiment of the present disclosure is described below with reference to the drawings Note that the embodiment described below is a specific example of the present disclosure. Therefore, numerical values, constituent elements, positions of the constituent elements, ways in which the constituent elements are connected, steps, an order of steps, and the like in the embodiment below are examples and are not intended to limit the present disclosure. Therefore, among constituent elements in the embodiment below, constituent elements that are not described in independent claims are described as optional constituent elements.

Each drawing is a schematic view and is not necessarily strict illustration. Note that substantially identical configurations are given identical reference signs in the drawings, and repeated description thereof is omitted or simplified.

EMBODIMENT

Figure 1B:
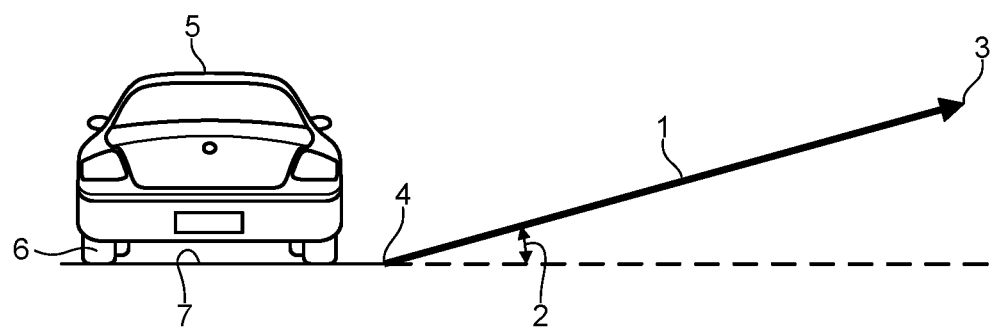
FIG. 1B illustrates the slope and a vehicle in the present embodiment.

FIG. 1A is a perspective view illustrating slope 1 in the present embodiment. FIG. 1B illustrates slope 1 and vehicle 5 in the present embodiment. Slope 1 can be defined by inclination angle 2, inclination direction 3, and a position of boundary line 4 with a reference plane.

In the field of in-vehicle products, the plane used as a reference for determining an inclination is typically a plane (contact plane 7) with which wheels 6 of vehicle 5 are in contact although the reference plane may be a horizontal plane. This is because what is important is an amount of relative angular change, that is, how a vehicle body posture changes before and after boundary line 4 when vehicle 5 enters slope 1, and necessity of an angle (i.e., an absolute inclination) of slope 1 with respect to the horizontal plane is low.

In view of this, in the present embodiment, basically, contact plane 7 with which vehicle 5 is in contact is used as a reference, and an angle of slope 1 with respect to contact plane 7 is regarded as inclination angle 2, a line at which contact plane 7 and slope 1 cross is regarded as boundary line 4, and a direction orthogonal to boundary line 4 and pointing away from vehicle 5 is regarded as inclination direction 3. In another example, the horizontal plane may be used as a reference.

Although information on contour line 8 acquired from a navigation apparatus is based on a sea level (horizontal plane), contour line 8 displayed on a driving assistance apparatus is basically based on contact plane 7. In another example, the horizontal plane may be used as a reference. An angle based on the horizontal plane is found from an angle based on contact plane 7 and an inclination of contact plane 7 with respect to the horizontal plane.

Figure 2:
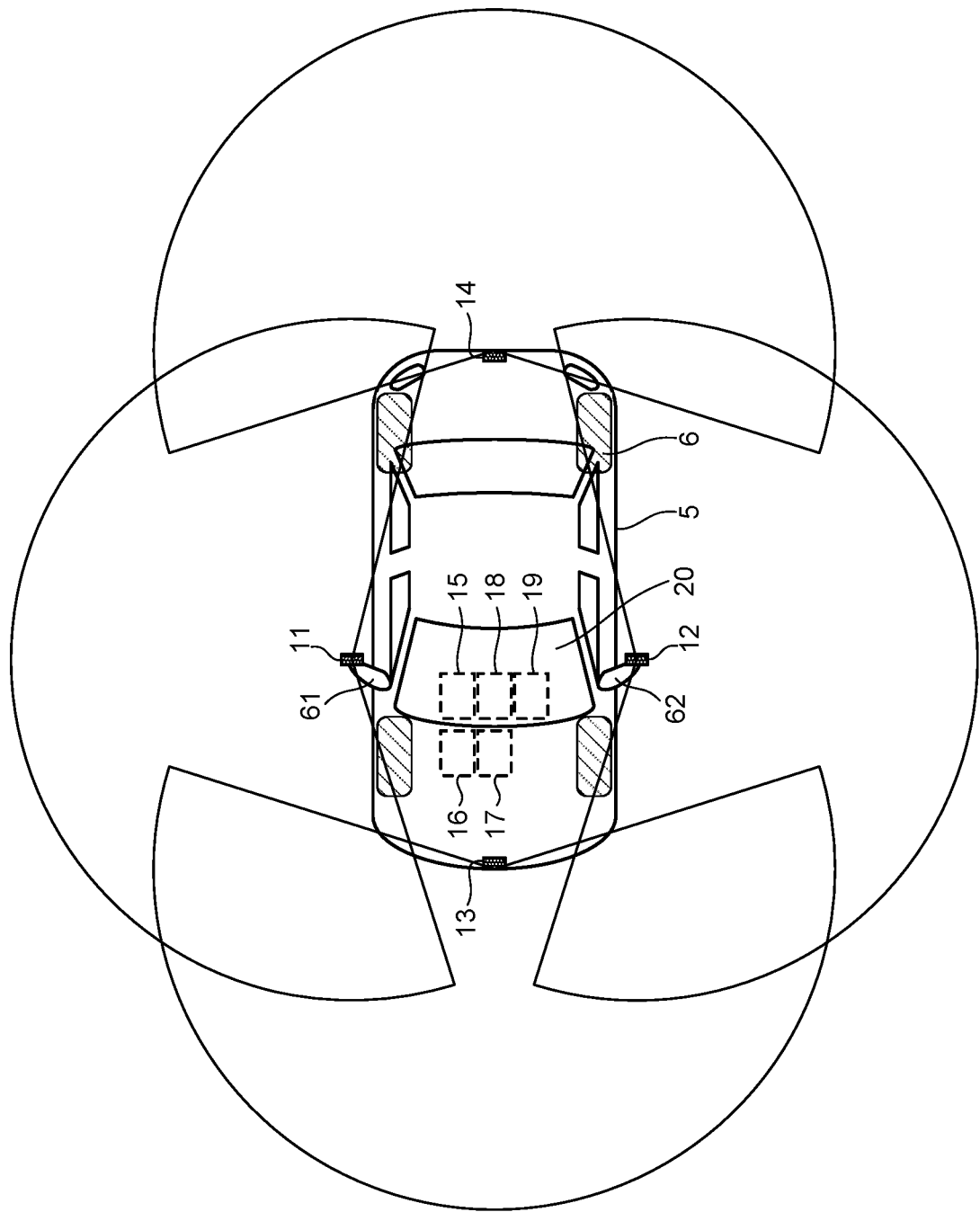
FIG. 2 is a vehicle interior layout diagram illustrating a driving assistance system in the present embodiment.
Figure 3:
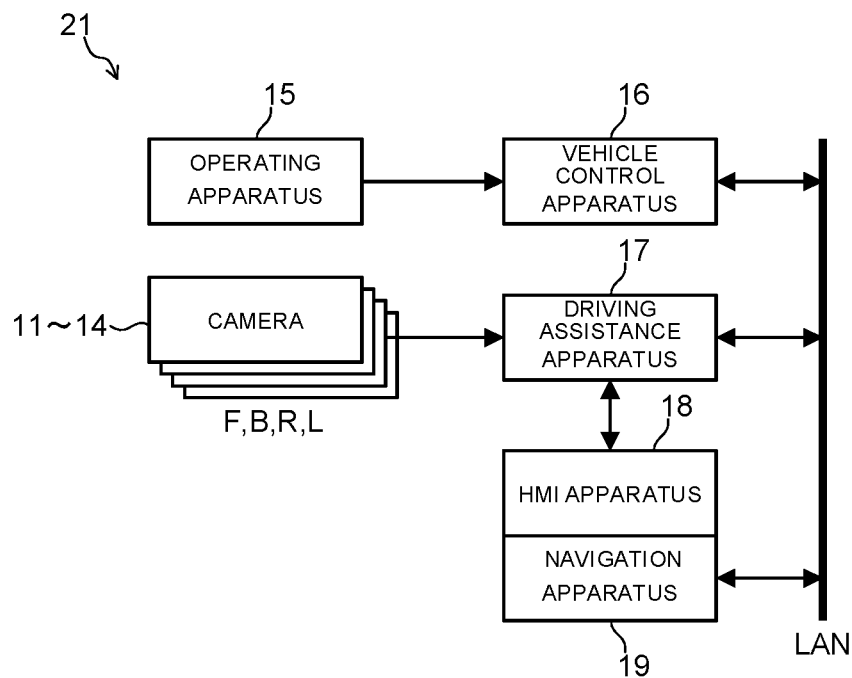
FIG. 3 illustrates a configuration of a driving assistance system on a network in the present embodiment.

FIG. 2 is a vehicle interior layout diagram illustrating driving assistance system 21 in the present embodiment. FIG. 3 illustrates a configuration on a network of driving assistance system 21 in the present embodiment. Driving assistance system 21 includes four in-vehicle cameras 11 to 14 provided on front, rear, left, and right of vehicle 5.

Front camera 13 (camera F) is disposed in a central portion ahead of occupant portion 20 of vehicle 5, and rear camera 14 (camera B) is disposed in a central portion behind occupant portion 20 of vehicle 5. Right camera 11 (camera R) is disposed on right mirror 61 of vehicle 5, and left camera 12 (camera L) is disposed on left mirror 62 of vehicle 5. Note that positions of cameras 11 to 14 are not limited to these positions and may be different positions.

Each camera includes a fish-eye lens and has a view range of 180 degrees or more in a horizontal direction. Since each camera is attached with a depression angle to capture a road surface, each camera can image a road surface in a range of approximately 240 degrees when an imaging range of a road surface is converted into a field of view in the horizontal direction.

Driving assistance system 21 has a function of generating an overhead image showing surroundings of a vehicle viewed from above by synthesizing images taken by in-vehicle cameras 11 to 14. Furthermore, driving assistance system 21 has an automatic parking function of calculating a parking path on the overhead image and automatically driving a vehicle along the parking path in a parking assistance mode. Driving assistance system 21 includes operating apparatus 15, vehicle control apparatus 16, driving assistance apparatus 17, HMI apparatus 18 (display apparatus), and navigation apparatus 19.

When a driver operates operating apparatus 15 such as a steering wheel and a pedal, vehicle control apparatus 16 receives the operation. In a normal manual driving mode, vehicle control apparatus 16 drives a motor (not illustrated) in accordance with information on the operation to control a steering angle and a vehicle speed and outputs the information on the operation and vehicle information such as the steering angle and the vehicle speed to a LAN (in-vehicle LAN). In an automatic driving mode, vehicle control apparatus 16 receives a command concerning a speed and a steering angle from driving assistance apparatus 17 over the LAN and controls the speed and the steering angle in accordance with the command.

Driving assistance apparatus 17 acquires information on an operation of the steering wheel, the pedal, or the like and vehicle information such as a steering angle and a vehicle speed over the LAN. The vehicle includes navigation apparatus 19 and uses human machine interface (HMI) apparatus 18 of navigation apparatus 19 as an HMI apparatus of the vehicle.

Driving assistance apparatus 17 can acquire positional information of vehicle 5 from navigation apparatus 19. Driving assistance apparatus 17 may receive the positional information of vehicle 5 output by navigation apparatus 19 over the LAN or may acquire the positional information of vehicle 5 directly from navigation apparatus 19. An occupant can operate driving assistance apparatus 17 by using HMI apparatus 18. HMI apparatus 18 is, for example, a touch panel and includes switches, a speaker, a voice recognition apparatus, and the like provided around the touch panel.

Cameras 11 to 14 always output camera images to driving assistance apparatus 17, and driving assistance apparatus 17 generates a display image showing surroundings of the vehicle from the camera images and outputs the display image to HMI apparatus 18 even in a case where parking assistance is not performed. HMI apparatus 18 is under control of navigation apparatus 19 and displays the display image output by driving assistance apparatus 17 while the vehicle is not traveling or is traveling at a low speed, but displays a map image generated by navigation apparatus 19 while the vehicle is traveling at a high speed. Since HMI apparatus 18 is integral with navigation apparatus 19, it is sometimes assumed in the following description that HMI apparatus 18 is included in the navigation apparatus.

Figure 4:
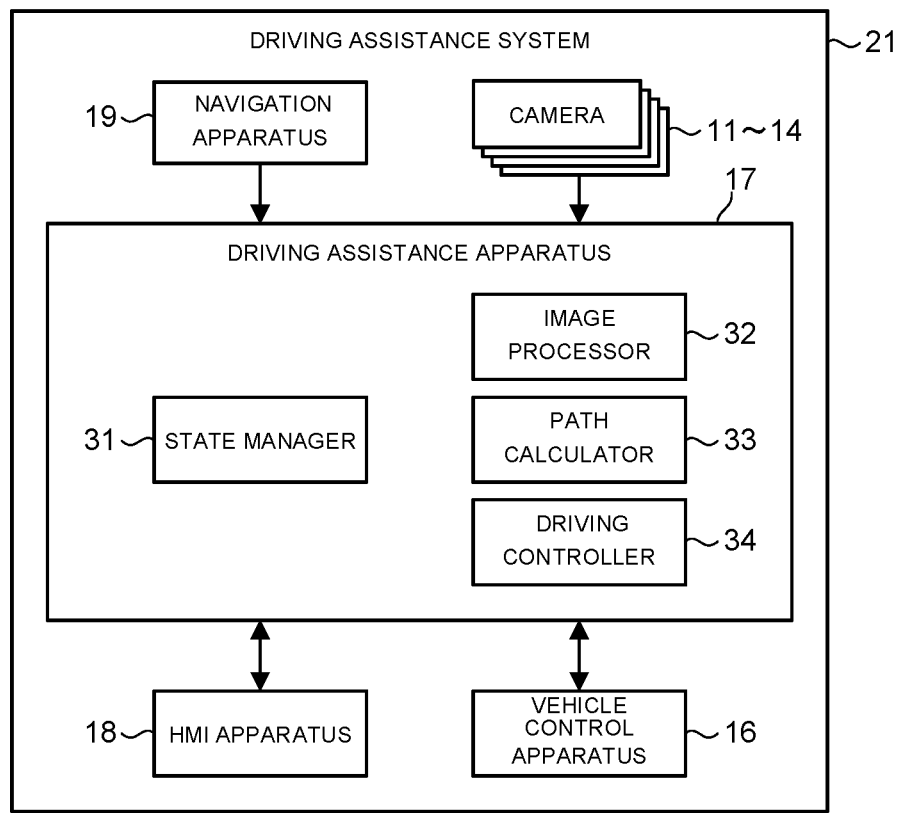
FIG. 4 is a block diagram illustrating a driving assistance apparatus in the present embodiment.

FIG. 4 is a block diagram illustrating driving assistance apparatus 17 in the present embodiment. State manager 31 manages an internal state of driving assistance apparatus 17, controls each section of driving assistance apparatus 17, and executes a sequence necessary for driving assistance.

For example, when the driver activates the parking assistance function by operating a screen (touch panel) of the navigation apparatus, state manager 31 causes image processor 32 to detect a parking frame line, and causes path calculator 33 to calculate a parking path in a case where the parking frame line is detected. When path calculation succeeds, the driver is given an inquiry as to whether or not to execute automatic parking. Upon receipt of an instruction to execute automatic parking, vehicle control apparatus 16 is switched to the automatic traveling mode, and automatic parking is executed by causing driving controller 34 to give an instruction concerning a gear, a speed, a steering angle, and the like.

Image processor 32 always generates a display image from camera images irrespective of whether or not the parking assistance function is on. A feature of the present embodiment lies in processing of image processor 32, and a conventional technique can be used for path calculation and driving control. Therefore, the processing of image processor 32 is described in detail, whereas detailed description of other parking assistance functions is omitted.

Figure 5:
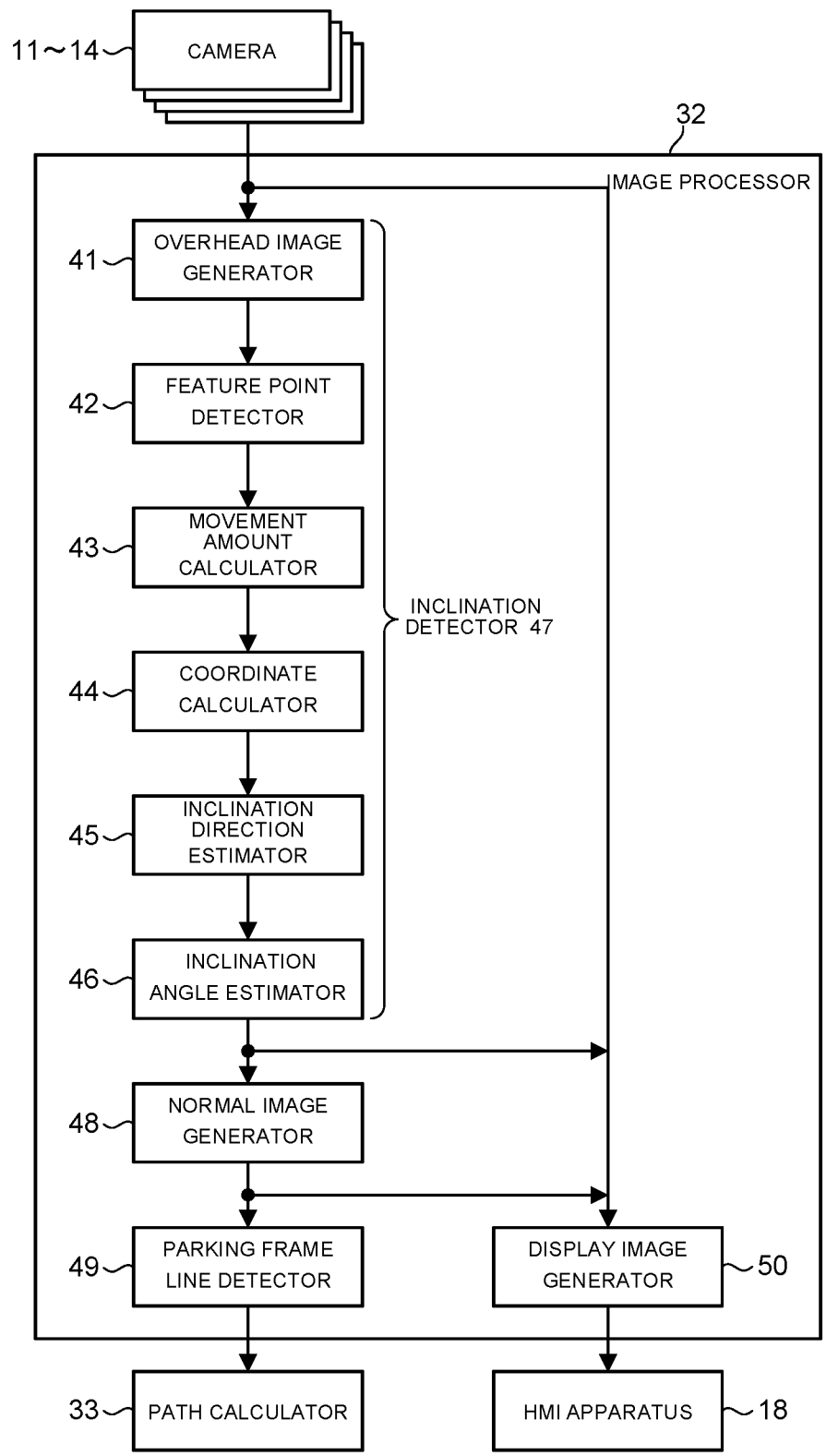
FIG. 5 illustrates a configuration of an image processor in the present embodiment.

FIG. 5 illustrates a configuration of image processor 32 in the present embodiment and is for explaining an internal functional configuration of image processor 32 and a flow of image processing. Overhead image generator 41 synthesizes a single overhead image from camera images output by four cameras 11 to 14. This overhead image generation processing includes projective transformation, and a projection plane is a surface with which the vehicle is in contact.

Feature point detector 42 detects, as feature points, corners of an image or bright points included in the overhead image and generates feature point information for each feature point. The feature point information is a structure including a plurality of information elements concerning a single feature point, and an information element can be changed or added later. An image detected as a feature point may be any image and may be a corner of a parking frame line, a pebble, or a shadow of a raised or recessed portion. In a case where a glassy stone such as quartz is mixed in a road surface of a concrete road or an asphalt road, the glassy stone is imaged as a bright point and therefore can be detected as a feature point. The feature point information may include a time of detection of a feature point as an information element. Feature point detector 42 detects feature points in image A taken during traveling and image B taken at a time later than image A by time T and sets, as feature point information of each feature point, feature point information (x, y) by adding feature point coordinates (x, y).

Movement amount calculator 43 calculates, for each feature point, a movement amount by which the feature point moves during time T. As for an image of an object on the plane with which vehicle 5 is in contact, a movement amount of the image corresponds to a movement amount of vehicle 5, and therefore in a case where a feature point in image B is located close to a position to which a feature point in image A has been moved by the movement amount of vehicle 5, the feature point in image B may be regarded as a feature point corresponding to the feature point in image A. That is, the movement amount of the feature point is a motion amount that occurs in appearance due to movement of vehicle 5 and therefore may also be called motion parallax. Processing for specifying feature points that correspond to each other is called pairing, and the pairing generates a pair of feature points. A pair of feature point information of the pair of feature points is merged into a single piece of feature point information including information on the movement amount. That is, movement amount calculator 43 calculates, for all pairs of feature points, motion parallax (movement amount v) of the feature point that occurs due to movement of the vehicle and obtains feature point information (x, y, v) by adding movement amount v to the merged feature point information. When expressing feature point information, not all elements are listed, but only elements related to processing are listed in some cases. For example, the expression "feature point information (x, y, v)" indicates that coordinates and a movement amount among elements of the feature point information are handled.

Feature point detector 42 may add information on a color to feature point information. That is, feature point information may include information on a color from the start. The information on a color may be, for example, values of three primary colors expressed by (R, G, B), may be luminance and a color difference expressed by (Y, U, V), or may be only luminance. For example, in a case where a corner of a white line drawn on an asphalt road surface is detected as a feature point, a color of higher luminance (i.e., a color of the white line) may be used as color information, a color of lower luminance (i.e., a color of the asphalt) may be used as color information, or both of these colors may be used as color information.

In a case where the feature point information includes color information, it is possible to shorten a processing time and prevent erroneous pairing since when movement amount calculator 43 detects (pairs) a pair of feature points in two images, movement amount calculator 43 selects feature points having substantially identical color information and detects a pair of feature points that correspond to each other among these feature points. Furthermore, in a case where a color of a feature point is added to feature point information, feature points on different slopes can be distinguished on the basis of the color information. This is because, for example, in a case where there are two slopes that are different in inclination direction, the slopes in a camera image have different colors due to a difference in direction with respect to a light source (e.g., sun) even if the slopes are made of the same material (e.g., concrete).

Figure 6:
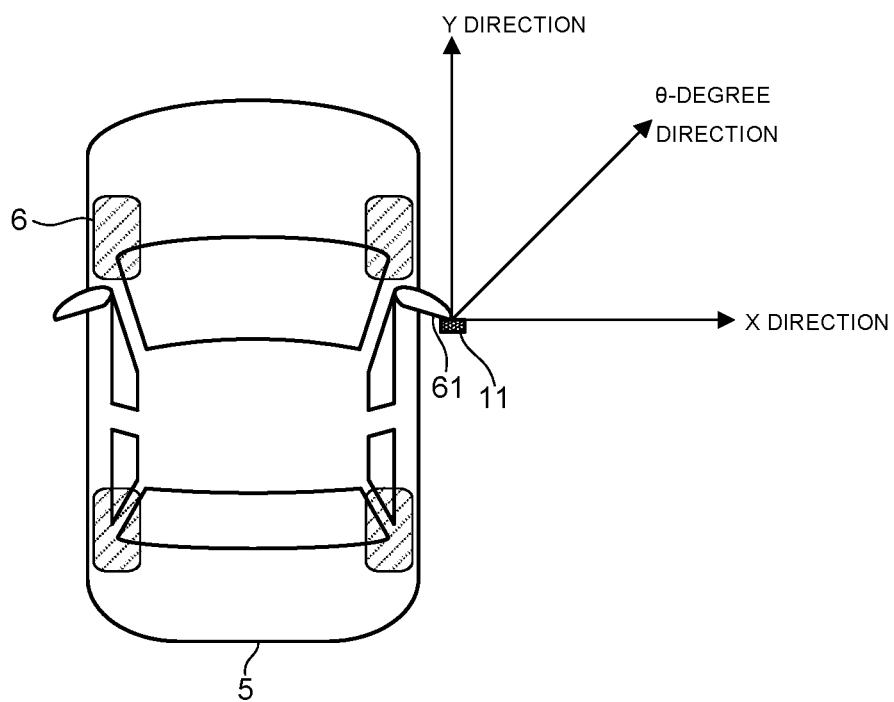
FIG. 6 illustrates coordinates of a feature point in the present embodiment.

FIG. 6 illustrates coordinates of a feature point in the present embodiment. The feature point information includes information on coordinates, and the coordinates may be expressed by a combination of a direction and a distance from an origin or may be expressed by a combination of distances in an X direction, a Y direction, and a Z direction from the origin. Since an example in which an image taken by right side mirror 61 is processed is described in the present embodiment, it is assumed that a point at which a perpendicular extending downward from camera 11 of right side mirror 61 crosses contact plane 7 of vehicle 5 is an origin, a rightward direction of vehicle 5 is the X direction, a frontward direction of vehicle 5 is the Y direction, and an upward direction of vehicle 5 is the Z direction. Regarding an angle (azimuth) on the XY plane, it is assumed that the X direction is 0 degree. Note that these standards of coordinates and an angle are merely an example and can be set in any way. Note that although latest coordinates (e.g., feature point coordinates in image B) are used as coordinates of a feature point in principle, coordinates detected at all times (feature points coordinates in image A and image B) may be held as feature point information.

Figure 7:
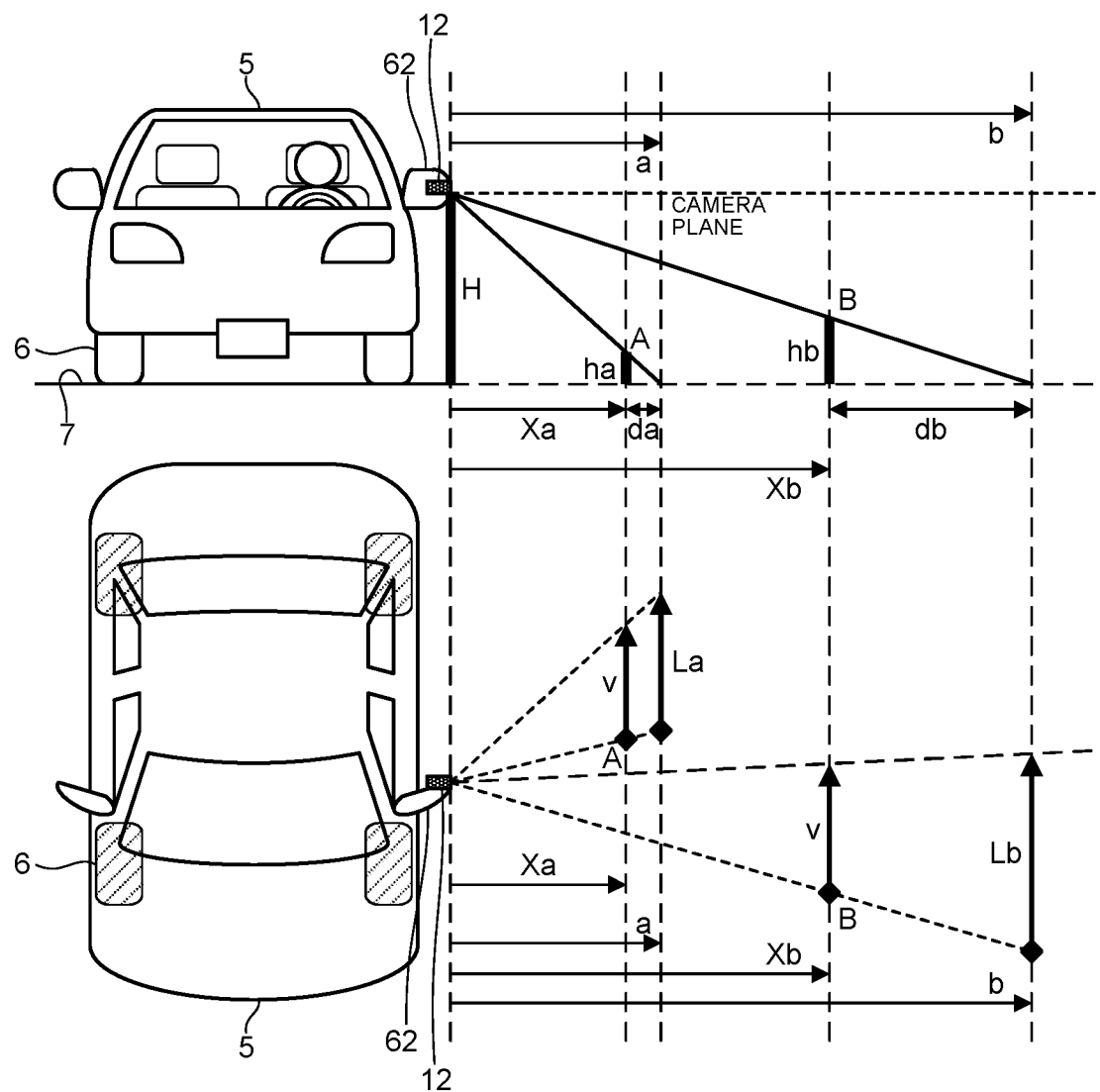
FIG. 7 illustrates a relationship between a height of a feature point and a movement amount on a projection plane in the present embodiment.

FIG. 7 illustrates a relationship between a height of a feature point and a movement amount on a projection plane in the present embodiment. Coordinate calculator 44 calculates, for each feature point, three-dimensional coordinates (X, Y, h) of the feature point from feature point information (x, y, v). First, a process of calculating actual height h of a feature point from feature point information on an overhead image is described by using the elevation view of FIG. 7.

Assume that horizontal distances of feature points A and B from the camera are Xa and Xb and heights of feature points A and B from contact plane 7 are ha and hb. Assume also that distances to feature points A and B on an overhead image that is obtained by performing projective transformation on an image taken by camera 12 located at height H while using contact plane 7 as a projection plane are a and b. In this case, da/ha=(a−Xa)/ha=a/H is established from similarity between triangles, and an equation H·a−H·Xa=ha·a is obtained. Furthermore, (H−ha)·a=H·Xa is established from this equation, and a is expressed as follows: a=Xa·H/(H−ha). Similarly, b is expressed as follows: b=Xb·H/(H−hb).

A plane that passes camera 12 and is parallel with the projection plane is referred to as a camera plane. (H−ha) and (H−hb) are distances from the camera plane to feature points A and B, respectively. Therefore, it can be said that a feature point having height h higher than the projection plane is projected at a distance multiplied by H/(H−h), that is, a distance multiplied by an inverse of a distance (H−h) from the camera plane to the feature point by projective transformation.

Although horizontal distances a and b are expressed as distances from the camera in the X-axis direction in FIG. 7, a ratio of the distances does not change even if an axis based on which the distances are expressed is changed to any direction due to similarity between triangles. That is, a feature point having a height is projected at a distance multiplied by an inverse of a ratio of a distance from the camera plane to the feature point and camera height H. Since camera height H is a constant number, it can be said that the feature point is projected at a distance multiplied by an inverse of the distance from the camera plane to the feature point. That is, it can be said that a magnification rate on the overhead image is determined only by an inverse ratio of the distance from the camera plane irrespective of a direction with respect to the vehicle.

Next, a relationship between a movement amount and a height of a feature point is described by using the plan view of FIG. 7. See feature point A at distance a on the overhead image. Feature point A is actually at distance Xa=a·(H−ha)/H, and a ratio of distance Xa to distance a is proportionate to a distance from the camera plane. When the vehicle travels forward by distance v in a unit time, movement amount La of feature point A at distance Xa on the overhead image is expressed by La=v·a/Xa since La/a=v/Xa is established from similarity between triangles. Similarly, movement amount Lb of feature point B at distance Xb on the overhead image is expressed by Lb=v·b/Xb.

When the relationship Xa=a·(H−ha)/H is used, distance a disappears as follows: La=v·a/Xa=v·a/(a·(H−ha)/H)=v·H/(H−ha). The same applies to the feature point at distance b. That is, a movement amount on the overhead image is determined only by an inverse ratio of a distance from the camera plane irrespective of a distance in the horizontal direction. Therefore, the distance from the camera plane can be calculated from the movement amount on the overhead image.

Figure 8:
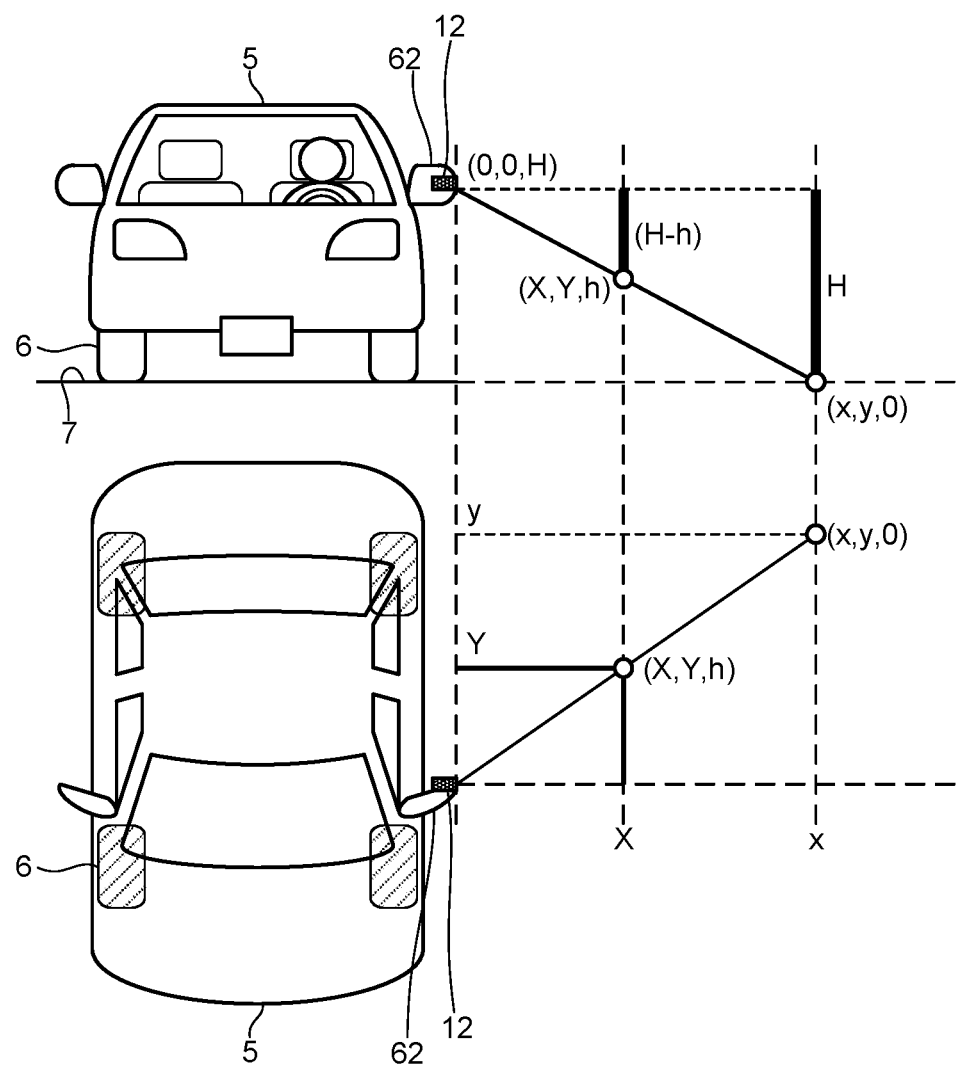
FIG. 8 illustrates calculation of three-dimensional coordinates of a feature point in the present embodiment.

FIG. 8 illustrates calculation of three-dimensional coordinates of a feature point in the present embodiment. When a distance of a feature point from the camera plane is calculated on the basis of a movement amount of the feature point on an overhead image, a distance from contact plane 7, that is, actual height h of the feature point is found. Assume that coordinates of the feature point on the overhead image are (x, y). When a coordinate of a height 0 of contact plane 7 is added, the three-dimensional coordinates of the feature point on the overhead image are (x, y, 0).

Assume that the position of camera 12 is (0, 0, H) and actual coordinates of the feature point are (X, Y, h). Since the actual feature point is located on a line connecting the camera and the feature point on the overhead image, it can be said from similarity between triangles that the actual feature point is located on this line at a position whose distance from the camera is (H−h)/H times larger than the distance to the feature point on the overhead image. Since similarity between triangles can also be applied to a distance in the X direction and a distance in the Y direction, X=x·(H−h)/H and Y=y·(H−h)/H are established. Therefore, the actual coordinates of the feature point are (x·(H−h)/H, y·(H−h)/H, h).

In summary, the feature point on the overhead image actually has a height and is located at two-dimensional coordinates different from actual coordinates on the overhead image, and therefore actual three-dimensional coordinates of the feature point can be calculated by calculating height h of the feature point from the movement amount of the feature point and specifying a point that is located on a line connecting the camera and the feature point on the overhead image and whose distance is (H−h)/H times larger than the distance to the feature point on the overhead image. By performing the above processing for each feature point, a three-dimensional distribution of the feature points can be obtained.

Figure 9A:
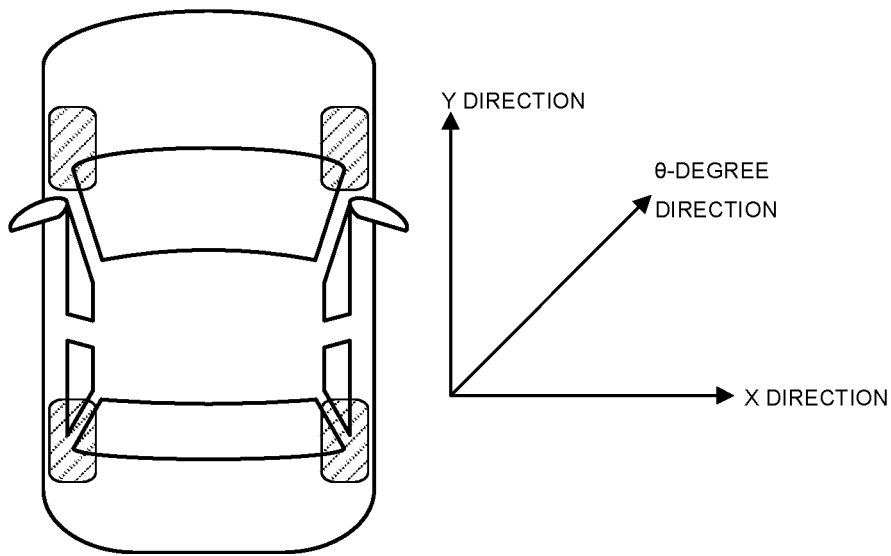
FIGS. 9A to 9C illustrate processing of an inclination direction estimator in the present embodiment.
Figure 9B:
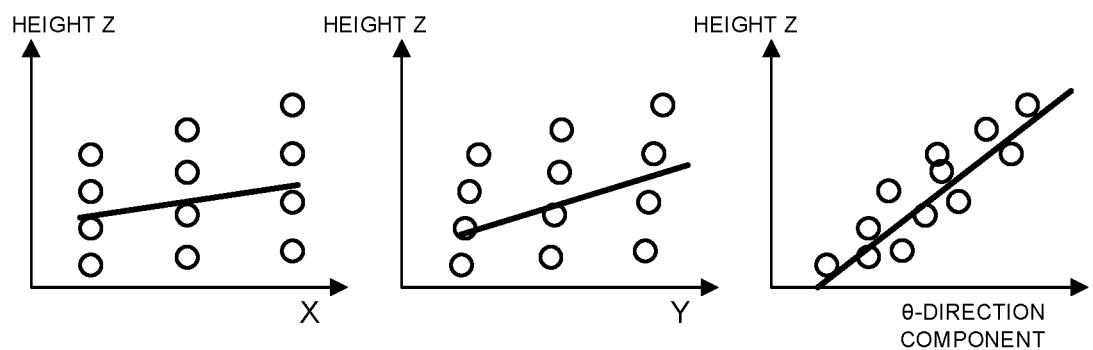
Figure 9C:
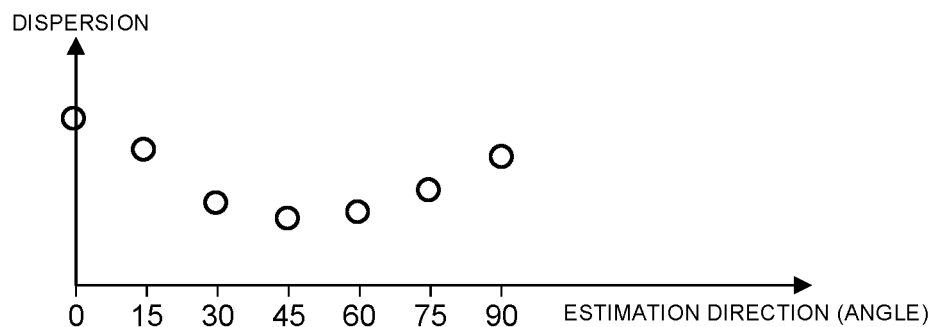

FIGS. 9A to 9C illustrate processing of inclination direction estimator 45 in the present embodiment. Inclination direction estimator 45 sets a plurality of estimation directions and performs, for each of the plurality of estimation directions, processing including performing linear approximation of a distribution of feature points on a two-dimensional plane whose first axis is a distance component to a feature point in the estimation direction and whose second axis is a height of the feature point and finding dispersion in the linear approximation. Inclination direction estimator 45 estimates that an estimation direction whose dispersion is minimum is an inclination direction. The two-dimensional plane may use an X-axis and a Y-axis as the axes, and the X-axis and the Y-axis may be interchangeable with a horizontal axis and a vertical axis, respectively.

More specifically, inclination direction estimator 45 first converts a distribution of the feature points in a three-dimensional space into a two-dimensional distribution whose horizontal axis is a distance component in a predetermined estimation direction and whose vertical axis is a height. This two-dimensional distribution is obtained for each of the plurality of estimation directions, and an estimation direction whose dispersion is minimum is found by analyzing the plurality of distributions. In this way, the inclination direction is estimated.

The processing of converting a distribution of the feature points in a three-dimensional space into a distribution on a two-dimensional plane is described in more detail. For example, in a case where feature point coordinates are (x, y, z), z is a height of the feature point. In a case where the estimation direction is the X direction, the distance component in the estimation direction is x. By ignoring an Y coordinate among the three-dimensional coordinates of the feature point, the three-dimensional feature point coordinates are projected onto two-dimensional coordinates (x, z). By performing the same processing for all feature points, a distribution of the feature points in a three-dimensional space is parallel-projected (orthographically-projected) onto the XZ plane whose horizontal axis is a distance component in the X-axis direction and whose vertical axis is a height (Z-axis), and thereby a distribution of the feature points on a two-dimensional plane is obtained. In a case where the estimation direction is the Y direction, the distance component in the estimation direction is y. By ignoring an X coordinate among the three-dimensional coordinates of the feature point, a distribution of the feature points in the three-dimensional space is parallel-projected onto the YZ plane whose horizontal axis is the Y-axis and whose vertical axis is the Z-axis, and thereby, in the case where the estimation direction is the Y-axis direction, a distribution on a two-dimensional plane whose horizontal axis is a distance component in the Y-axis direction and whose vertical axis is a height (Z-axis) is obtained.

As illustrated in FIG. 9B, in a case where a distribution of feature points in a three-dimensional space is converted into a two-dimensional distribution whose horizontal axis is X and whose vertical axis is Z and a two-dimensional distribution whose horizontal axis is Y and whose vertical axis is Z and both of these two-dimensional distributions are approximately inclined upward to the right, it can be estimated that the inclination direction is between the X direction and the Y direction. Therefore, as illustrated in FIG. 9C, the estimation direction is set to a θ-degree direction, and a two-dimensional distribution of the feature point whose horizontal axis is a distance component in the estimation direction is obtained while changing θ by 15 degrees, and dispersion of linear approximation of the two-dimensional distribution is plotted as a vertical axis. Since the dispersion is smaller as the estimation direction is closer to the inclination direction, it may be estimated that an estimation direction that is minimum in dispersion is the inclination direction.

An error in distance resulting from an inclination is mainly caused by an error in inclination angle, and influence of an error of inclination direction 3 is relatively small, and therefore inclination direction 3 need not strictly be found. For example, dispersion calculation of a distribution may be tried while changing an angle of the estimation direction so that dispersion becomes small by a width that is half of that in a previous step in a manner such as 0 degree, 80 degrees, 40 degrees, 60 degrees, 50 degrees, 55 degrees by using a bisection method, and the trial may be stopped when the dispersion or a rate of decrease of the dispersion becomes equal to or smaller than a predetermined threshold value, and an estimation direction at this time may be regarded as the inclination direction.

Alternatively, inclination direction estimator 45 may acquire external information from an input section (not illustrated) that receives external information and set an initial value of the estimation direction on the basis of the external information. For example, in a case where dispersion calculation of a distribution is tried while changing the estimation direction by using a bisection method, an initial value of the estimation direction may be determined on the basis of external information (e.g., map information acquired via the input section) instead of setting the initial value of the estimation direction to a fixed value such as 0 degree. For example, information on contour line 8 (information on an inclination of terrain) may be extracted from the map information output by navigation apparatus 19, and the initial value of the estimation direction may be determined on the basis of the extracted information.

In general, economical development is often performed for a parking space of housing land developed on inclined ground so that an inclination angle is reduced without markedly changing an inclination direction from that before the development in order to reduce a step between an inside and an outside of the housing land. Therefore, by setting the initial value of the estimation direction to a direction orthogonal to contour line 8, estimation can be started from an angle close to the inclination direction in many cases.

Furthermore, in many cases, a parking space is set in an end portion of housing land in a direction orthogonal to or parallel to a road which the housing land faces and is given a gradient ascending from the road so that water does not flow from the road. In view of this, the initial value of the estimation direction may be set to the direction orthogonal to the road. The information acquired by the input section may be inclination information of vehicle 5 output by a clinometer of vehicle 5. This is because an inclination of land before development remains not only on housing land, but also on a road in many cases.

An inclination of vehicle 5 indicates an inclination of a road on which vehicle 5 is traveling, and in a case where a road which a parking space faces is inclined, an inclination direction of the parking space is often between an inclination direction of the road and a direction orthogonal to the road (a direction of the parking space). This is to prevent a step between the road and the parking space from becoming markedly different between a right side and a left side of frontage. As described above, the initial value of the estimation direction may be set by using a plurality of pieces of external information. In a case where the initial value of the estimation direction is close to the inclination direction, the number of trials of dispersion calculation can be made small.

Figure 10A:
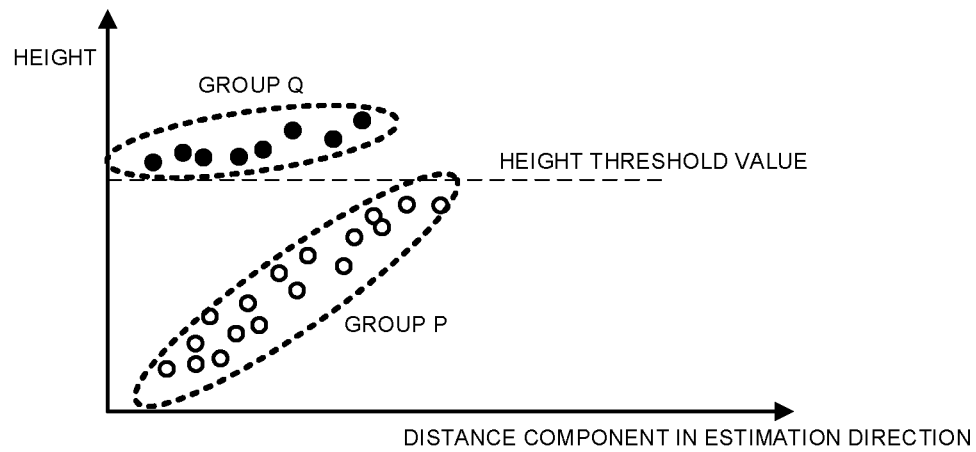
FIGS. 10A and 10B illustrate classification of feature points and estimation of an inclination information based on a distribution of feature points in the present embodiment.
Figure 10B:
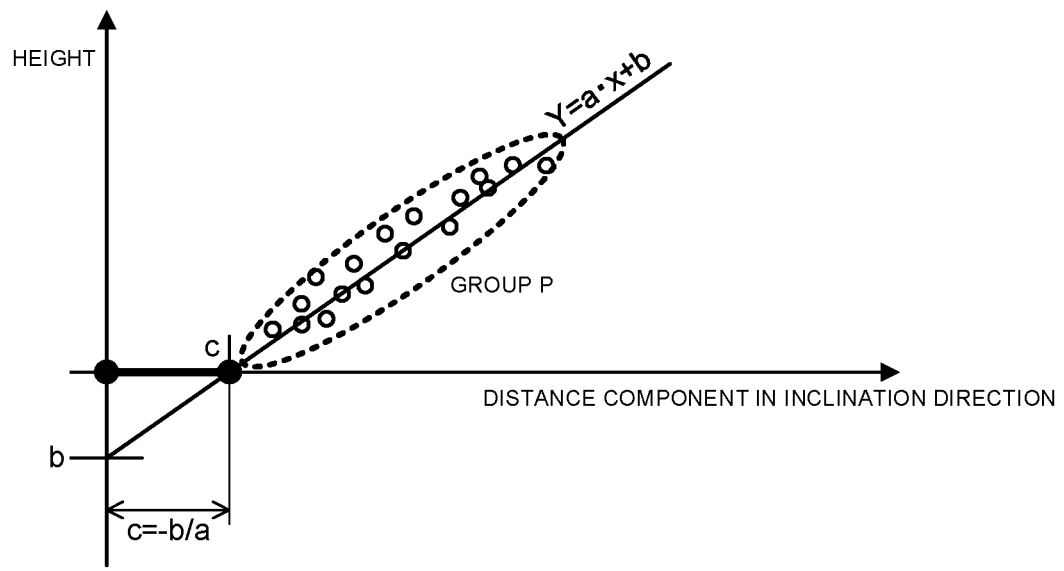

FIGS. 10A and 10B illustrate classification of feature points and estimation of inclination information based on a distribution of feature points in the present embodiment. In the processing for estimating the inclination direction from a distribution of feature points, in a case where feature points on a plurality of slopes are mixed, the distribution is sometimes divided into a plurality of groups, as illustrated in FIG. 10A. Even if the inclination direction is estimated from the distribution including the feature points on the plurality of slopes, an inclination direction of one slope cannot be correctly estimated. It is therefore necessary to classify the feature points into groups corresponding to the slopes.

Inclination direction estimator 45 may classify the feature points on the basis of colors, heights, positions on a plane, or a distribution of three-dimensional coordinates of the feature points and estimate an inclination direction on the basis of the feature points thus classified. For example, in a case where inclination direction estimator 45 classifies the feature points on the basis of the heights of the feature points, a height threshold value may be set, and feature points lower than the height threshold value may be classified into feature point group P, and feature points higher than the height threshold value may be classified into feature point group Q, as illustrated in FIG. 10A. Alternatively, feature point group P and feature point group Q may be separated on the basis of a difference in distribution of three-dimensional coordinates.

Inclination direction estimator 45 may classify the feature points on the basis of the colors of the feature points. Since slopes that are different in inclination direction are imaged as images having different colors, feature points on one slope and feature points on another slope can be distinguished by comparing the colors of the feature points.

Inclination direction estimator 45 selects feature points on one slope by any of the methods and specifies an inclination direction by analyzing a distribution of three-dimensional coordinates of the feature points thus selected. Once the inclination direction is specified, an inclination angle of the slope can be specified. Inclination angle estimator 46 finds the inclination angle on the basis of the distribution of the three-dimensional coordinates of the selected feature points and the inclination direction. As illustrated in FIG. 10B, the distribution of the three-dimensional coordinates of the feature points is converted into a two-dimensional distribution whose horizontal axis is a distance component in the inclination direction and whose vertical axis is a height of a feature point, and linear approximation of the two-dimensional distribution is performed by using a linear function ($Y = a \cdot X + b$). As a result, the inclination angle of the slope is found from the coefficient a (a=gradient).

Furthermore, a distance to a line (boundary line) at which the slope and the contact plane cross is found as an intersection ($c = -b/a$) of the straight line with the X-axis. Distance c may be referred to as a distance to the slope. A combination of coefficients a and b of the linear function and the inclination direction is referred to as inclination information. Alternatively, a combination of gradient a, distance c to the slope, and the inclination direction may be the inclination information.

Figure 11:
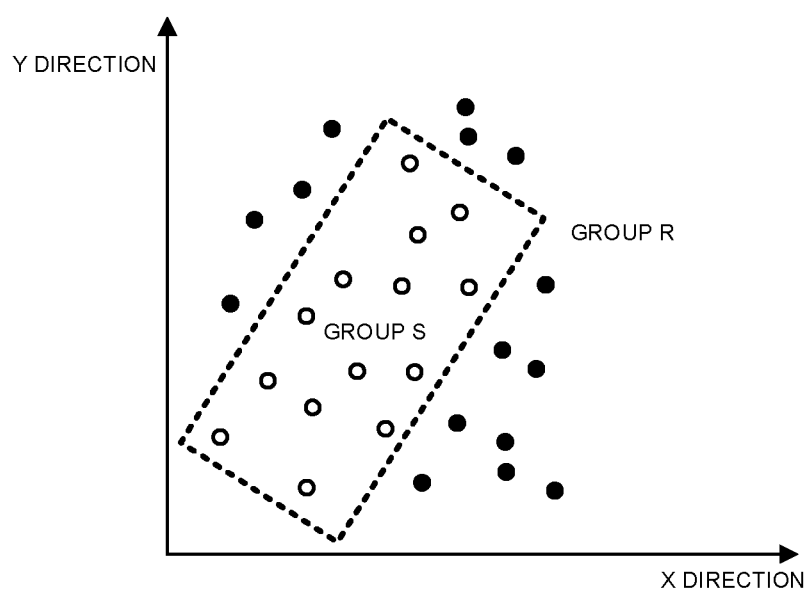
FIG. 11 illustrates parking space setting in the present embodiment.

FIG. 11 illustrates parking space setting in the present embodiment. Inclination direction estimator 45 may detect a region suitable for parking on the basis of colors, heights, positions on a plane, or a distribution of three-dimensional coordinates of feature points and set a target parking position within the region suitable for parking.

In a case where feature points are distributed on XY coordinates and feature point group S having a low height is surrounded by feature point group R having a higher height than feature point group S, it is evaluated whether or not a region surrounding feature point group S has a size suitable for parking, and in a case where a length and a width of the region are larger than a length and a width of the vehicle, respectively, it is determined that a region suitable for parking has been detected, and a target parking position may be set within the region suitable for parking. In this example, it can be said that the region suitable for parking has been detected on the basis of the heights of the feature points or it can be said that the region suitable for parking has been detected on the basis of the positions of the feature points on a plane or it can be said that the region suitable for parking has been detected on the basis of a distribution of three-dimensional coordinates of the feature points.

Alternatively, a feature point group of a parking space may be distinguished from another feature point group on the basis of colors. For example, an aerial photograph of a target location input to navigation apparatus 19 may be acquired by an Internet search, and the aerial photograph may be imported from the input section (not illustrated). Then, a parking space that faces a road and a color thereof may be specified from the aerial photograph, and feature points having a color close to the specified color may be distinguished from feature points having a different color. It may be determined that a region suitable for parking has been detected in a case where there is a region occupied by feature points having a color close to the color of the parking space and the region is almost flat and has a size that allows the vehicle to be parked in the region.

In a case where a target parking position is set within the region suitable for parking, an inclination direction and an inclination angle may be estimated only for feature point group S within the region suitable for parking without estimating an inclination direction and an inclination angle for other feature point group R. Alternatively, an inclination direction and an inclination angle may be estimated with high accuracy only for feature point group S, whereas an inclination direction and an inclination angle may be estimated with low accuracy for other feature point group R. This is because once the target parking position is set, it is only necessary for the vehicle to travel to the target parking position and be parked at the target parking position and necessity of inclination information of other portions is low.

In a case where processing capability of driving assistance apparatus 17 is limited, inclination information may be calculated only for feature points of a region suitable for parking after the region suitable for parking is detected without performing inclination information calculation at all until the region suitable for parking is specified. For example, inclination information may be calculated only for a target parking position and a traveling path to the target parking position, and calculation of inclination information for other regions may be put off until later or may be omitted.

In a case where the vehicle travels off-road, a plurality of slopes having different inclination directions and inclination angles are typically present around the vehicle. Since a driver controls the vehicle to travel on a slope which the driver selects, providing the driver with inclination information of the slope assists driving. For example, feature points on different slopes are classified into different groups on the basis of colors of the feature point, heights of the feature points, positions of the feature points on a plane, a distribution of three-dimensional coordinates of the feature points, and the like, and inclination information (an inclination direction and an inclination angle) is calculated on the basis of a distribution of feature points belonging to one group. By performing this processing for each group, inclination directions and inclination angles of the plurality of slopes around vehicle 5 can be specified.

Even in a case where a slope has a curved shape, an inclination direction and an inclination angle can be specified while regarding the slope as a combination of a plurality of slopes by classifying feature points into groups. For example, in a case where a slope that is covered with concrete has a gradually changing gradient, colors of feature points, specifically, brightness of concrete surfaces of the feature points vary depending on a difference in angle with respect to a light source such as sun. Therefore, it is only necessary to classify the feature points into a group of feature points of a portion having a small inclination angle and a group of feature points of a portion having a large inclination angle by determining whether or not luminance is larger than a threshold value, and specify an inclination direction and an inclination angle for each of the groups.

Even in such a case where terrain around vehicle 5 is not a combination of flat surfaces but a curved surface, the terrain around vehicle 5 can be modeled by being approximated by a combination of flat planes by classifying feature points on the curved surface into a plurality of groups and estimating an inclination direction and an inclination angle for each group.

The following shifts to description of a display image that shows terrain around vehicle 5. In the following description, it is assumed that the terrain around vehicle 5 is modeled as a combination of flat planes. Since the processing for specifying an inclination direction and an inclination angle and processing for reflecting the inclination direction and the inclination angle in the display image require a considerable computation amount, the processing for specifying an inclination direction and an inclination angle may be omitted for a groups including a small number of feature points and the processing for reflecting the inclination direction and the inclination angle in the display image may be omitted for a slope having a small area or a slope that is not located in a traveling direction of the vehicle. That is, the model of the terrain around the vehicle may be simplified in accordance with limitation of processing capability.

Conversely, in a case where there is enough processing capability, processing for displaying, as natural smooth terrain, the terrain modeled as a combination of flat planes may be additionally performed. For example, in a case where there is a plane expressed by a polygonal shape such as a hexagonal shape or a polygonal shape with a larger number of angles, processing for replacing the shape of the plane with an ellipse or a circle.

Figure 12A:
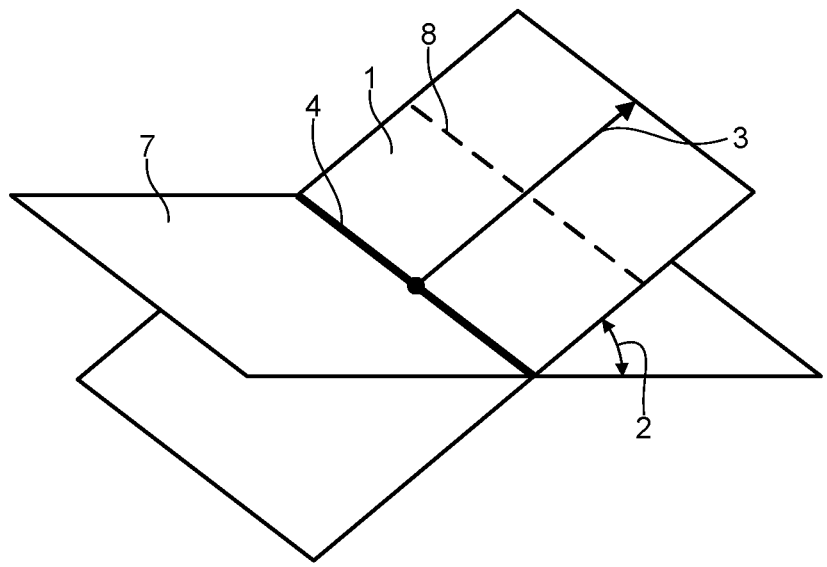
FIGS. 12A and 12B illustrate a projection plane of a normal image and a mapping table in the present embodiment.
Figure 12B:
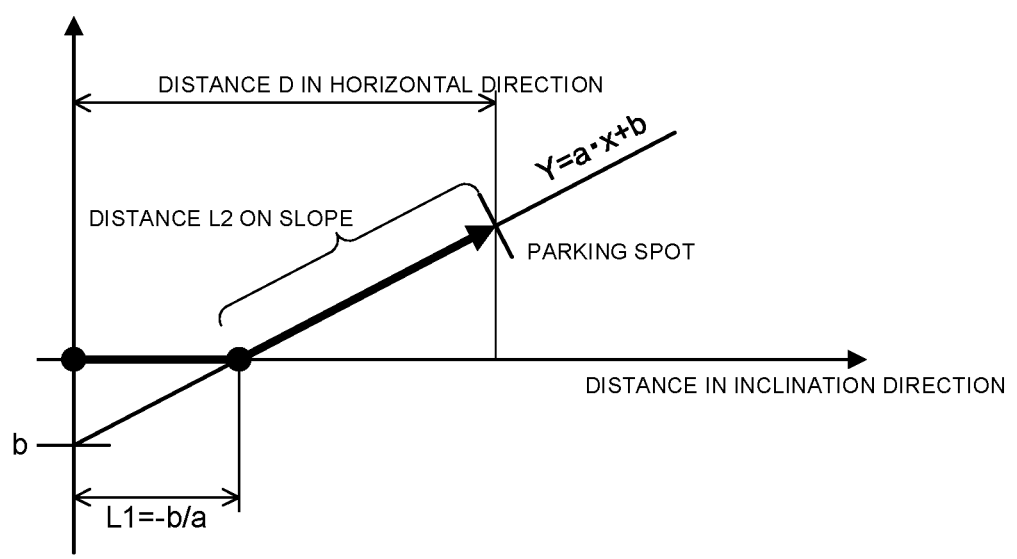

The following returns to description of processing performed for the purpose of parking. For the purpose of parking, a normal image showing an accurate distance is generated. FIGS. 12A and 12B illustrate a projection plane of a normal image and a mapping table in the present embodiment. Normal image generator 48 generates a normal image showing an accurate distance on the basis of inclination information (coefficients a and b and an inclination direction) of slope 1.

Specifically, normal image generator 48 sets a projection plane of projective transformation for generating a normal image on the basis of an inclination direction and an inclination angle. For example, normal image generator 48 specifies a position of boundary line 4 where contact plane 7 and slope 1 cross, and performs, for a region of slope 1 on a far side relative to boundary line 4, projective transformation so that the projection plane matches slope 1 on the basis of the inclination direction and the inclination angle and performs, for contact plane 7 (road surface) on a near side relative to boundary line 4, projective transformation so that the projection plane matches contact plane 7.

On a typical overhead image, a feature point on an ascending slope at a position higher than contact plane 7 is projected as if the feature point is located on contact plane 7 and is therefore projected at a position farther than an actual position. However, by causing a projection plane to match the slope, no error in distance is caused by projective transformation. The normal image corresponds to an image obtained by horizontally straightening ground bent along boundary line 4.

In a case where vehicle 5 travels from a spot where vehicle 5 is in contact with the ground to a parking spot on slope 1 and is parked at the parking spot, a distance to the parking spot is a sum (L1+L2) of distance L1=−b/a to boundary line 4 and distance L2 from boundary line 4 to the parking spot. This distance is longer than horizontal distance D to the parking spot. A distance over which wheels travel needs to be accurately calculated in path calculation for automatic parking, and performing path calculation on the normal image makes it possible to more accurately perform automatic parking.

Normal image generator 48 may execute projective transformation by using a mapping table (abbreviated as MT).

The mapping table is a table concerning movement amounts of pixels in generation of pixels of an output image from pixels of an input image. In other words, the mapping table is a table in which a movement amount (dx, dy)=(x1−x2, y1−y2) of a pixel centered at a position (x2, y2) of an input image used to generate a pixel at a position (x1, y1) on output image V is defined for all output pixels (x, y).

Figure 13A:
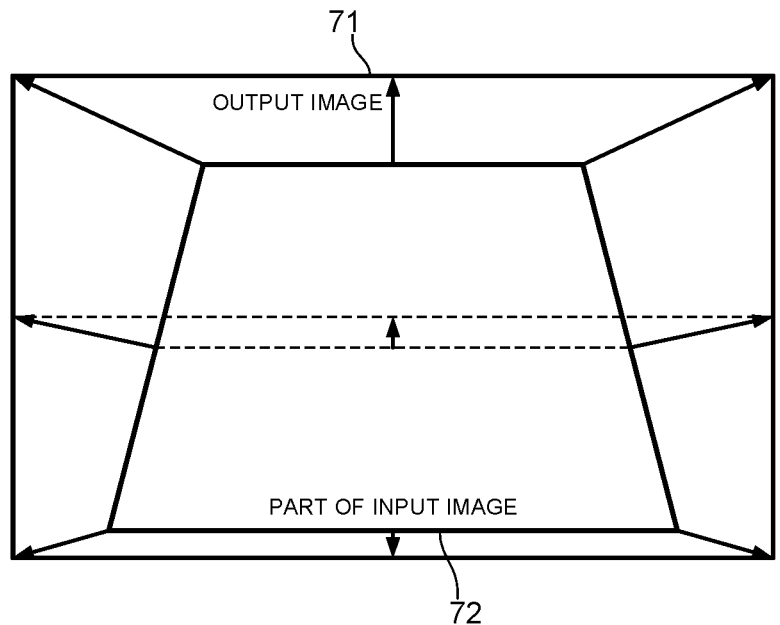
FIGS. 13A and 13B schematically illustrate a mapping table in the present embodiment.
Figure 13B:
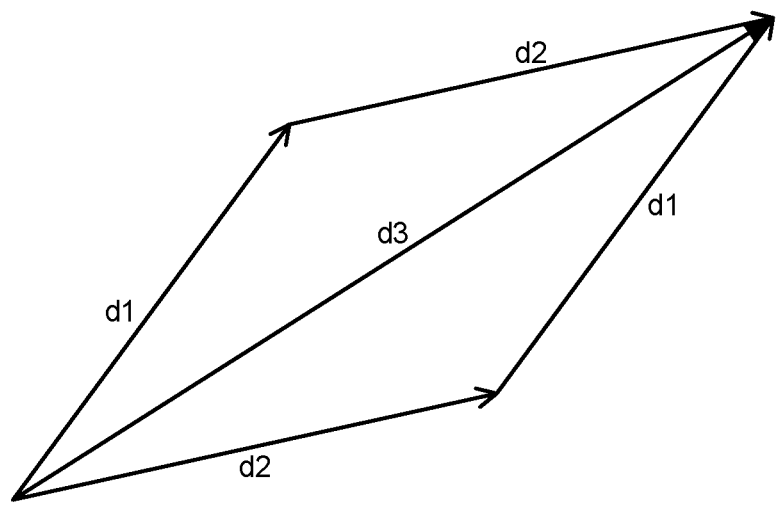

FIGS. 13A and 13B schematically illustrate a mapping table in the present embodiment. FIGS. 13A and 13B schematically illustrate a mapping table for projective transformation for transforming a camera image taken by a camera directed obliquely downward into an overhead image like an image taken from directly above. Since the mapping table designates how far an input pixel used to synthesize an input image is located corresponding to a pixel of an output image, movement amount d of a pixel can be expressed as a vector (dx, dy) corresponding to an arrow in FIGS. 13A and 13B (d=(dx, dy) where d is a movement vector).

The projective transformation into an overhead image may be rephrased as overhead transformation. In a case where overhead transformation is performed on a camera image taken by a camera directed obliquely downward, a pixel farther from the camera moves farther from a center of the image, and therefore a movement vector is outward, and a farther pixel (an upper pixel on the camera image) is larger in movement amount, as illustrated in FIG. 13A.

An image that has been projective-transformed can be further projective-transformed. For example, an image that has been overhead-transformed can be projective-transformed again (re-projected) into an image with an inclined projection plane. An image generated by performing projective transformation two times by using a mapping table can be generated by performing projective transformation one time by using a mapping table obtained by combining two mapping tables. As illustrated in FIG. 13B, movement vector d3 for synthesizing a pixel of an image obtained after re-projection from an original camera image is obtained by vector synthesis d3=d1+d2 where d1 is a movement vector of overhead transformation and d2 is a movement vector of the re-projection.

As is clear from the equation, a final re-projection image does not change even in a case where an order of overhead transformation and re-projection in which a projection plane is inclined is reversed. That is, an addition law is established. Since a mapping table is a table of movement vectors, the addition law is also established for a mapping table. Since mapping tables can be added up and combined as described above, it is also possible to blend mapping tables.

The projective transformation for generating a normal image may be performed by using a mapping table corresponding to an inclination direction and an inclination angle, and a mapping table for a portion where the inclination direction or the inclination angle changes from one to another may be generated by blending one mapping table and another mapping table.

Figure 14:
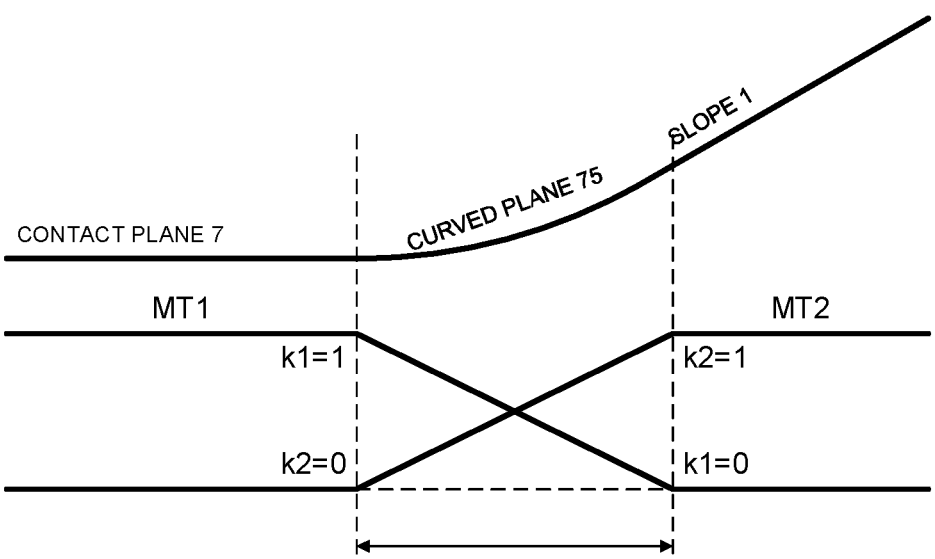
FIG. 14 illustrates blending of mapping tables in the present embodiment.

FIG. 14 illustrates blending of mapping tables in the present embodiment. In a case where a camera image is an orthographically-projected image having no lens distortion, projective transformation for transforming the camera image into an overhead image is linear transformation. Since the addition law is also established for a mapping table used for projective transformation, mapping tables can be combined, that is, blended.

For example, when a mapping table for overhead transformation for projection onto contact plane 7 is MT1: P (px, py) and a mapping table for projective transformation for projection onto slope 1 is MT2: Q (qx, qy), mapping table MT3: R (rx, ry) is obtained by combining the two mapping tables by weighted mean: rx=k1×px+k2×qx, ry=k1×py+k2×qy (k1+k2=1).

Accordingly, in projective transformation using mapping table MT3, an inclination direction of a projection plane is identical to that of slope 1 of FIG. 14, and an inclination angle of the projection plane depends on weight coefficients k1 and k2 and takes a value between an inclination angle of contact plane 7 and an inclination angle of slope 1. For example, in a case where a gradient of the contact plane is 0 and k1=k2=0.5, a gradient of the projection plane is half of a gradient of the slope.

For example, in a case where curved surface 75 having constant curvature and a smoothly changing inclination angle is present between contact plane 7 and slope 1, both ends of mapping table MT3 for projection onto curved surface 75 are made continuous with mapping table MT1 for contact plane 7 and mapping table MT2 for slope 1 by changing weight coefficients k1 and k2 by a linear function so that k1=1 and k2=0 at a boundary with contact plane 7 and k1=0 and k2=1 at a boundary with slope 1 and obtaining arithmetic mean. In this way, projective transformation can be performed so that the projection plane and the ground match in a range covering contact plane 7, curved surface 75, and slope 1.

Note that in a case where the camera image has lens distortion, the addition rule is not established for a mapping table for concurrently performing lens distortion correction since the lens distortion correction is non-linear transformation. In this case, the above method can be applied in a case where the distortion correction processing is separately performed earlier and an image after the distortion correction is regarded as a camera image.

Figure 15:
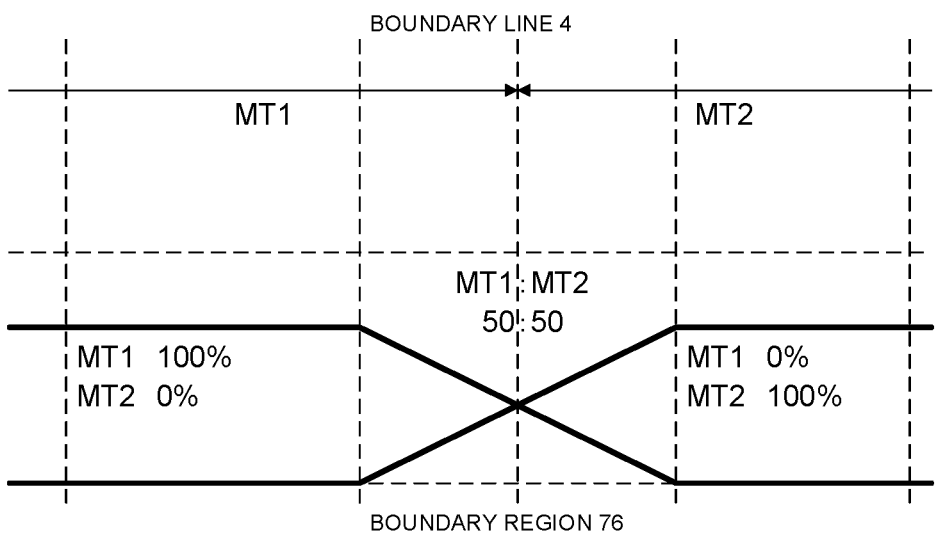
FIG. 15 illustrates generation of a normal image using a mapping table in the present embodiment.

FIG. 15 illustrates generation of a normal image using a mapping table in the present embodiment. In a case where curved surface 75 is not present between contact plane 7 and slope 1 and the inclination angle is switched at boundary line 4, the image may be synthesized by using MT1 on a near side of boundary line 4, and the image may be synthesized by using MT2 on a far side of boundary line 4. However, in a case where there is an error in estimation of an inclination direction or estimation of an inclination angle, an estimated position of boundary line 4 is deviated from an actual position of the boundary line (a line connecting points where the gradient actually changes). For example, in a case where the slope is not one manually created, the actual boundary line is not a straight line, but an irregular curved line in many cases.

Therefore, in a case where the mapping table is switched from MT1 to MT2 at boundary line 4, an image in the vicinity of boundary line 4 is bent unnaturally. In view of this, even in a case where curved surface 75 is not detected between contact plane 7 and slope 1, mapping table blending may be performed in boundary region 76 including boundary line 4 so that the projection plane is continuously curved, as in the case where curved surface 75 is present.

Since a projection plane of boundary region 76 is continuous with both of the projection plane of contact plane 7 and the projection plane of slope 1, bending of an image does not occur even in a case where the position of boundary line 4 is different from an actual position. Note that a width of boundary region 76 where the projection plane is set to curved surface 75 may be set in accordance with a result of analysis of an image in the vicinity of boundary line 4.

For example, in a case where a line that is substantially parallel with boundary line 4 is present in the vicinity of boundary line 4, the width of boundary region 76 may be set so that an image of this line is included in boundary region 76. In a case where a line that is substantially parallel with boundary line 4 is not detected in the vicinity of boundary line 4, it may be estimated curved surface 75 is actually present and the width of boundary region 76 may be set wide.

Figure 16:
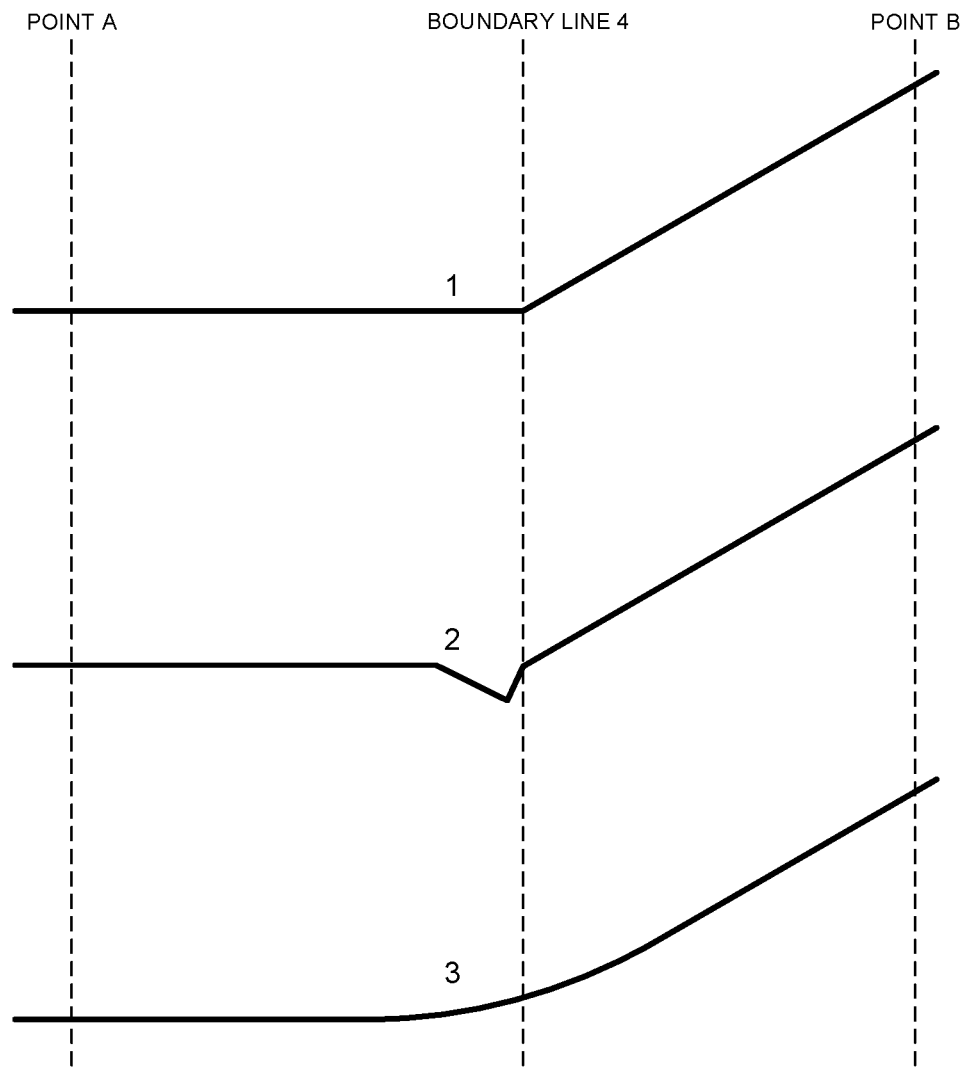
FIG. 16 illustrates correction of a normal image in the present embodiment.

FIG. 16 illustrates correction of a normal image in the present embodiment. Normal image generator 48 may correct a normal image in accordance with a result of analysis of an image in the vicinity of boundary line 4. The following describes how much a distance differs depending on terrain in the vicinity of the boundary assuming that vehicle 5 moves from point A to point B by crossing boundary line 4 in FIG. 16.

For example, a case where an inclination is switched at boundary line 4 (see case 1) and a case where a groove is present in the vicinity of the boundary line (see case 2) are compared. Wheels 6 rotate more when crossing the groove. This increases the number of rotations of the wheels. That is, in a case where the distance is measured on the basis of the number of rotations of wheels 6, the distance to point B is longer in case 2 than in case 1.

In view of this, for example, in a case where an image that is parallel with boundary line 4 is found as a result of analysis of an image in the vicinity of boundary line 4, it may be estimated that a groove-like structure is present, and correction for stretching a boundary line 4 portion of the normal image in a direction orthogonal to boundary line 4 may be additionally performed.

In a case where a gradient gradually changes before and after boundary line 4 (see case 3), the moving distance to point B is shorter than in case 1. In view of this, for example, in a case where a clear image that is parallel with boundary line 4 is not observed as a result of analysis of an image in the vicinity of boundary line 4, correction for shrinking the boundary line 4 portion of the normal image in the direction orthogonal to boundary line 4 may be additionally performed. By thus performing correction in accordance with the terrain of the boundary line 4 portion, the distance on the normal image can be made accurate.

Next, driving assistance based on inclination information is described. Specifically, inclination detector 47 detects an inclination direction and an inclination angle of a slope or a road surface around a vehicle on the basis of a camera image, and display image generator 50 generates a display image showing surroundings of the vehicle viewed from above on the basis of inclination information (including the inclination direction and the inclination angle). Driving assistance apparatus 17 outputs the display image to HMI apparatus 18 and assists driving by displaying the display image for a driver. For example, when performing parking assistance (automatic parking), driving assistance apparatus 17 presents an overhead image based on the inclination information and seeks for driver's judgment. When a parking instruction is given, driving assistance apparatus 17 performs automatic parking by controlling a steering angle and a vehicle speed so that vehicle 5 travels along a parking path set on a normal image.

The display image presented to a driver during off-road traveling is required to have easiness of grasping an inclination angle and unevenness rather than accuracy of a distance although the overhead image used for automatic parking is desirably a normal image in which a distance is accurate. For example, if a camper van is parked on inclined ground in a campsite, inconvenience may occur during sleeping. It is therefore important to easily know an inclination angle by viewing the display image. That is, a suitable display image varies depending on the scene.

For example, a display image may be generated by superimposing a supplemental image (e.g., an arrow indicating an inclination direction) that makes it easy to grasp an inclination onto a normal image, and when a driver sets a target parking position on the display image, the vehicle may be automatically parked at the position. This can start path calculation at a time when the driver sets the target parking position on the display image (≈normal image). As has been described, assuming that automatic parking is performed, it is more advantageous to generate a display image from a normal image than to generate a display image from an overhead image.

On the other hand, for the purpose of traveling on a rough road, it is desirable to assist driving of vehicle 5 by superimposing an additional image based on an inclination direction of a slope or a road surface around the vehicle detected by inclination detector 47 without using a normal image since accuracy of a distance is not needed. For example, if the vehicle travels in a direction almost orthogonal to the inclination direction of the slope, the vehicle body may be greatly tilted, which may overturn the vehicle. In view of this, it is desirable to superimpose an additional image that allows the driver to grasp the inclination direction so that the driver can select a safe path.

Since inclination detector 47 further detects an inclination angle, it is desirable to assist driving of the vehicle on the basis of the inclination direction and the inclination angle. In a case where the driver knows the inclination angle, the driver can control vehicle 5 to avoid a slope having a large inclination angle. In view of this, driving of the vehicle may be assisted by generating, from a camera image, an overhead image (oblique overhead image) whose point of view is placed obliquely rearward of vehicle 5 and superimposing, onto the overhead image, an additional image that allows the driver to grasp the inclination angle based on inclination information (including the inclination direction and the inclination angle) acquired from inclination detector 47.

In a case where vehicle 5 is traveling and a display image based on a normal image is not generated, generation of a normal image may be stopped. The oblique overhead image makes it easier to grasp an inclination and unevenness than a normal image, but superimposing a supplemental image that makes it easy to grasp an inclination and unevenness makes it still easier to grasp an inclination and unevenness. Specific examples of the supplemental image that makes it easy to grasp an inclination and unevenness are described below.

Figure 17A:
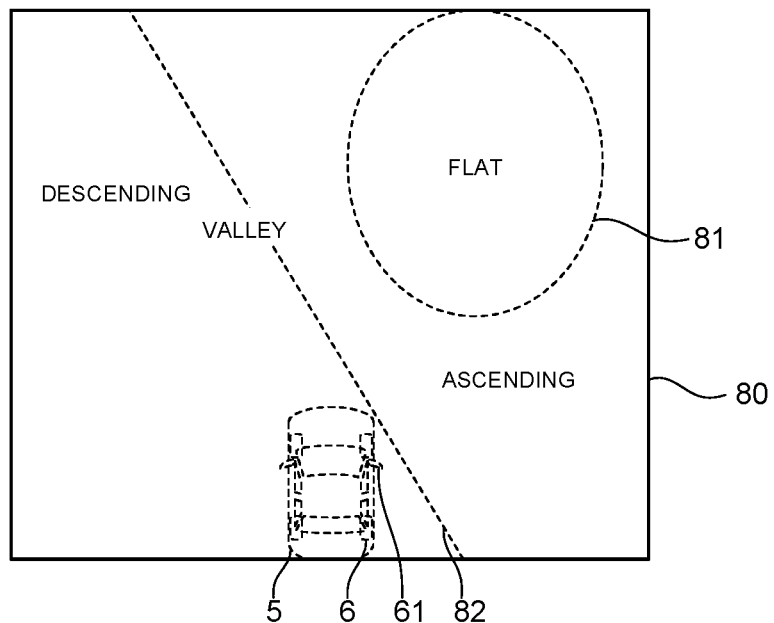
FIGS. 17A and 17B illustrate an example of a display image in the present embodiment.
Figure 17B:
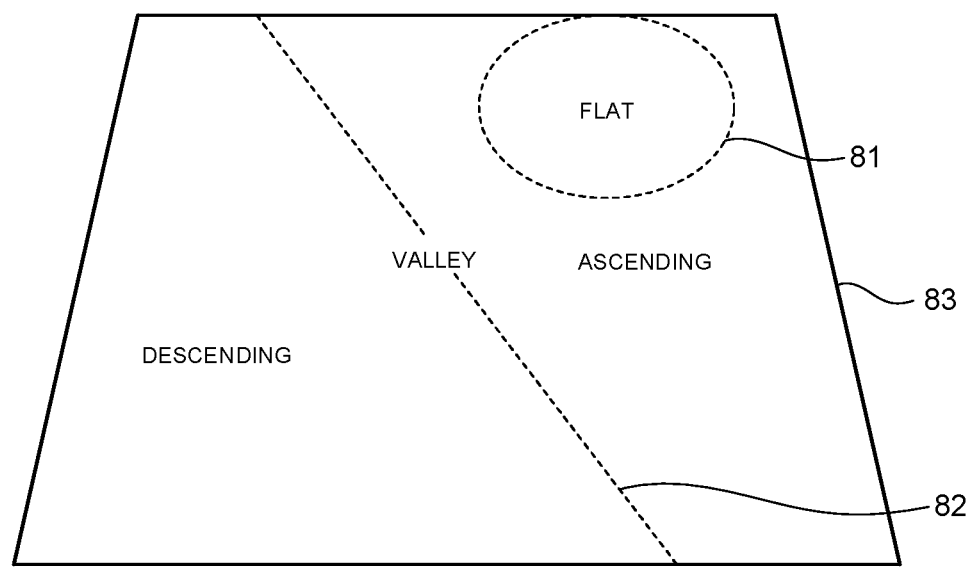

FIGS. 17A and 17B illustrates an example of a display image in the present embodiment. FIG. 17A illustrates example 1 of the display image. The display image of example 1 is an image that is assumed to be displayed on panel 80 of navigation apparatus 19 when automatic parking is performed. A vehicle image is displayed to show a positional relationship with vehicle 5, and a region ahead of vehicle 5 is displayed wide in a case where vehicle 5 is in forward gear.

As an example of terrain, it is assumed that flat portion 81 where one vehicle can be parked is present ahead of vehicle 5 on the right. It is assumed that ground within flat portion 81 is horizontal and has no gradient. Valley 82 is present between vehicle 5 and flat portion 81, and vehicle 5 is located on a slope descending toward valley 82.

A height of a bottom of valley 82 is constant, and valley 82 extends linearly. The slope on a near side of valley 82 descends toward valley 82, and an inclination direction thereof is constant. A portion located beyond valley 82 when viewed from vehicle 5 ascends away from the valley. A portion around flat portion 81 is inclined toward a center of flat portion 81.

FIG. 17B illustrates example 2 of the display image. The display image of example 2 is an oblique overhead image viewed from obliquely above. It is assumed that the display image of example 2 is projected onto head-up display 83 (HUD) during driving assistance. In a case where the display image is displayed on HUD 83, a point of view is identical to a driver's point of view, and therefore a vehicle image, which is displayed to show the point of view, is not displayed. The display image of example 2 shows the same terrain as the display image of example 1.

Figure 18A:
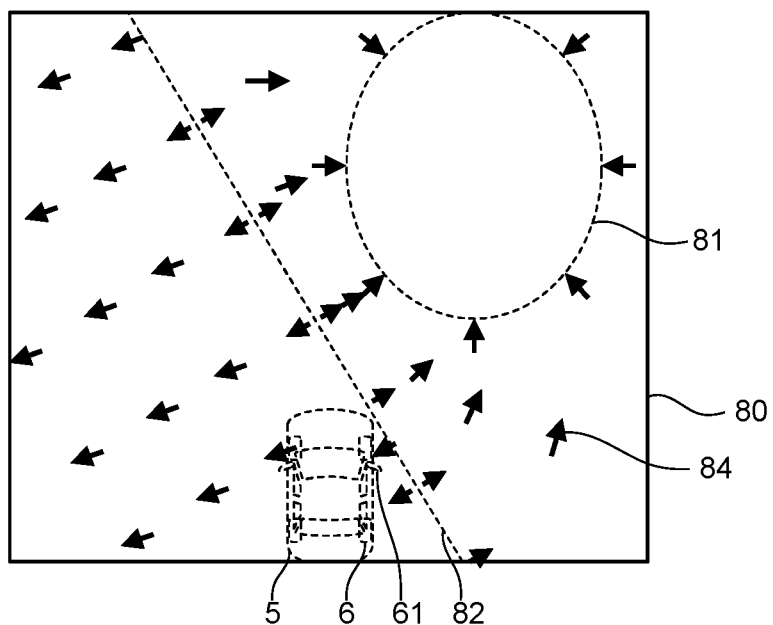
FIGS. 18A to 18C illustrate an example in which a gradient is indicated by arrows in the present embodiment.
Figure 18B:
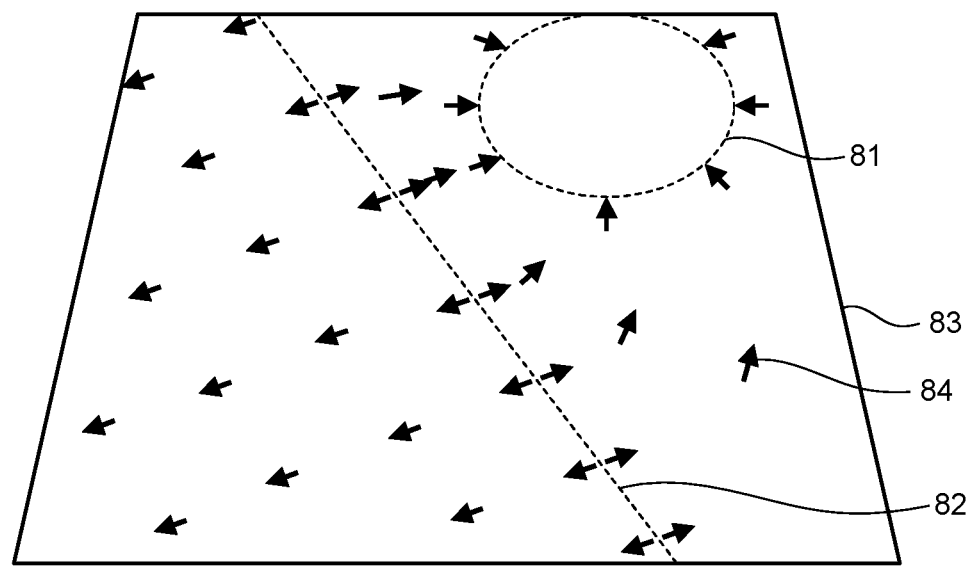
Figure 18C:

FIGS. 18A to 18C illustrate an example in which a gradient is indicated by arrows 84 in the present embodiment. In FIGS. 18A to 18C, the display image is an overhead image showing surroundings of the vehicle viewed from a virtual point of view above the vehicle or obliquely above the vehicle, and a plurality of arrows are superimposed as an additional image on the display image. Each arrow is displayed corresponding to an inclination direction and an inclination angle. For example, directions of the arrows correspond to inclination directions at positions where the arrows are added, and dimensions or colors of the arrows correspond to inclination angles at positions where the arrows are added. Note that the dimensions of the arrows may be lengths, line thicknesses, or sizes of the arrows.

FIG. 18A illustrates an example of an overhead image showing inclination directions as directions of arrows 84, and FIG. 18B illustrates an example of an oblique overhead image showing inclination directions as directions of arrows 84. Positions of arrows 84 may correspond to heights. For example, arrows 84 may be arranged along contour line 8 connecting positions of an identical height. Arrows 84 may be directed in a direction orthogonal to contour line 8, and arrows 84 may be directed in an ascending direction or may be directed in a descending direction. Since no arrow 84 is displayed in a horizontal portion and fewer arrows 84 are displayed in a portion where the gradient is more gradual, it is apparent that a portion where no arrow 84 is displayed or fewer arrows 84 are displayed is flatter than other portions.

Alternatively, a density of arrows 84 may correspond to the gradient. Since an interval between contour lines 8 is narrow in a place where the gradient is steep, arrows 84 directed in a direction orthogonal to contour lines 8 are densely arranged. Alternatively, an interval at which arrows 84 are arranged in a direction parallel to contour line 8 may be made narrower as the gradient becomes steeper.

As illustrated in FIG. 18C, arrows having different forms or sizes may be used corresponding to gradients. For example, in a place where the gradient is steep, a line of an arrow is made thicker or longer or a tip of an arrow may be made larger or duplicated than in a place where the gradient is gradual.

Figure 19A:
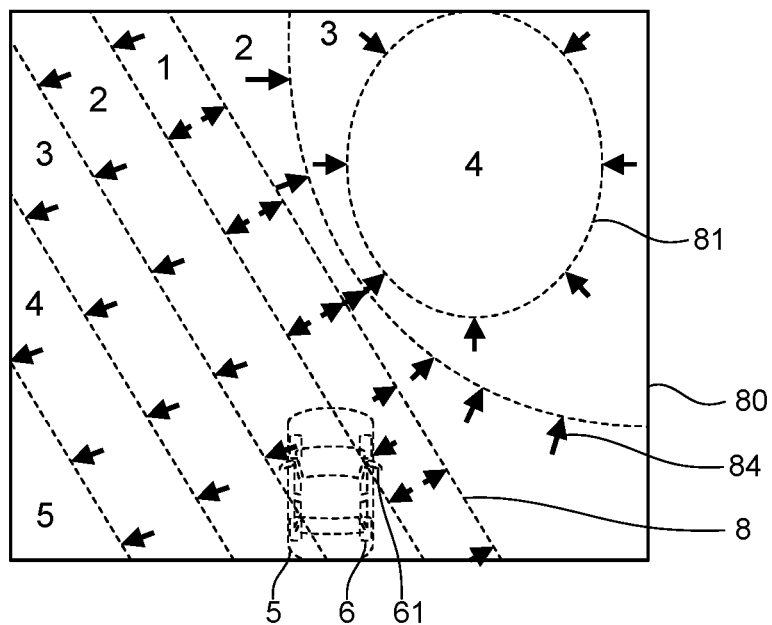
FIGS. 19A and 19B illustrate an example in which a gradient is expressed by contour lines in the present embodiment.
Figure 19B:
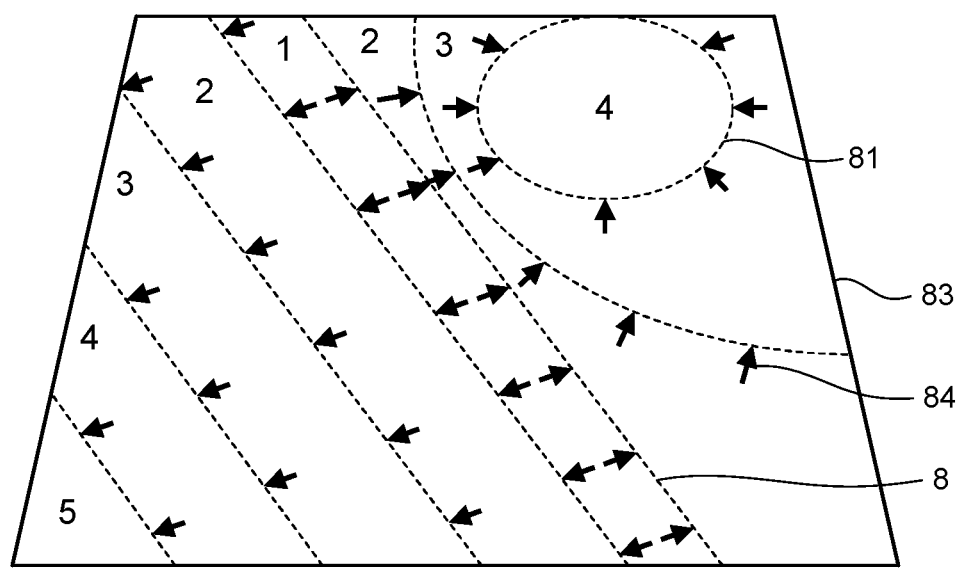

FIGS. 19A and 19B illustrate an example in which a gradient is expressed by contour lines 8 in the present embodiment. FIG. 19A illustrates an example in which a display image is an overhead image as a whole, and FIG. 19B illustrates an example in which a display image is an oblique overhead image as a whole. In the examples of FIGS. 19A and 19B, the gradient is expressed not only by contour lines 8, but also by arrows 84. Since which region is a valley, which region is a mountain, and in which direction a region ascends are unknown in a case where only contour lines 8 are used, an inclination direction may be thus indicated by arrows 84.

Heights may be expressed by superimposing hatchings or semi-transparent masks that are different in color or luminance onto regions divided by contour lines 8. For example, in a case where hatchings that are different in luminance are superimposed onto regions 1 to 5 divided by contour lines 8, heights can be intuitively grasped by setting luminance low in a low region and setting luminance high in a high region.

Alternatively, semi-transparent masks may be superimposed so that a colder color is used in a lower region and a warmer color is used in a higher region. Alternatively, no color may be used in region 2 where vehicle 5 is located, a cold color or a dark color may be used in a region lower than vehicle 5, and a warm color or a bright color may be used in a region higher than vehicle 5. Instead of using the same color within a region, colors may be used in gradation corresponding to heights so as to continuously change over the regions.

In a case where heights are made recognizable by using colors or luminance, lines (contour lines 8) expressing boundaries between regions need not be displayed or the boundaries may be made indistinguishable by gradation. In a case where heights are expressed by colors or luminance, arrows 84 indicating inclination directions need not be displayed.

Figure 20:
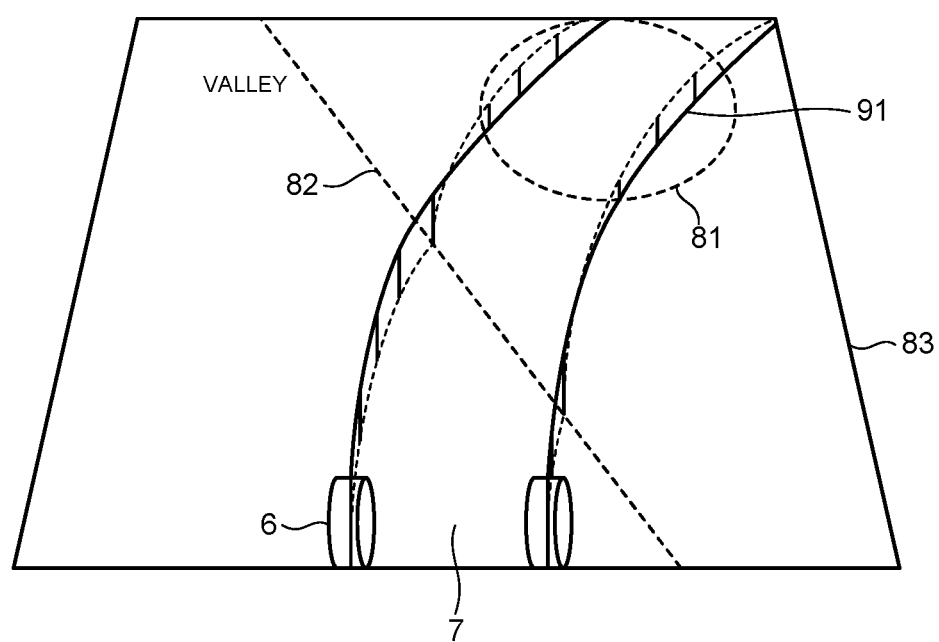
FIG. 20 illustrates an example of a display image for driving assistance in the present embodiment.

Next, an example of a display image for assisting driving is illustrated. FIG. 20 illustrates an example of a display image for driving assistance in the present embodiment. The display image is an oblique overhead image showing surroundings of a vehicle viewed from a virtual point of view obliquely above the vehicle, and a pair of course prediction lines extending on a reference plane used as a height reference and lines or planes that connect a road surface or a slope and the course prediction lines and are perpendicular to the reference plane are superimposed as an additional image on the display image. In this example, a plane including lower ends of wheels 6 is set as the reference plane and course prediction lines 91 extend from contact points of wheels 6 although a height of the reference plane can be set to any height.

The driving assistance is, for example, steering assistance and assists driver's selection of a suitable course. For this purpose, course prediction lines 91 indicating a path along which wheels 6, especially front wheels travel are displayed on the display image and are moved leftward or rightward in accordance with a steering angle, and a height of a position where wheels 6 pass is indicated by the lines or planes connecting the course prediction lines and the road surface or slope. In this way, rising and falling of the wheels on the course prediction lines are expressed, and thereby a driver can determine whether or not the path along which the front wheels travel is appropriate. For example, in a case where the planes connecting the course prediction lines and the slope are large and the driver feels that valley 82 is deep, the driver may control steering so that valley 82 is avoided.

An image indicating wheels may be superimposed so that the driver can intuitively know that course prediction lines 91 indicate a course of wheels 6. The image of wheels 6 may be displayed so that a direction thereof changes in accordance with a steering angle. Furthermore, an image indicating a vehicle body may also be superimposed so that a positional relationship with the vehicle body can be grasped. During driving, the driver is required to carefully look forward, and it is therefore desirable to project the display image onto a windshield by HUD 83 so that the driver can see the display image concurrently with a forward region.

The display image is desirably an oblique overhead image showing the forward region viewed from obliquely above so that a direction of a line of sight of the driver who sees a road surface ahead and a direction of a line of sight of the display image match. Note that in a case where wheels 6 or the vehicle body is superimposed onto the oblique overhead image, the road surface beyond wheels 6 or the vehicle body is hidden, and therefore, in a case where wheels 6 or the vehicle body is superimposed, it is desirable to use a semi-transparent image so that the road surface beyond wheels 6 or the vehicle body can be seen.

As illustrated in FIG. 20, in a case where course prediction lines 91 extend from contact points of wheels 6 and there are differences in height from uneven ground, the differences in height may be expressed by lengths of straight lines extending from course prediction lines 91 to the ground. In this case, a color of the straight lines used in a case where the ground is located below course prediction lines 91 and a color of the straight lines used in a case where the ground is located above the prediction lines may be made different so that a height relationship can be grasped.

Furthermore, lines passing directly above or directly below course prediction lines 91 may be drawn on the ground so that a change in gradient can be grasped from curvature of the lines. The lines are obtained by parallel-projecting the course prediction lines onto the road surface or the slope in a projection direction perpendicular to the reference plane and therefore may be referred to as course prediction projected lines. It can be said that the straight lines extending from course prediction lines 91 to the ground are lines connecting course prediction lines 91 and the course prediction projected lines.

Alternatively, a curtain-like or wall-like image extending from course prediction lines 91 to the ground may be displayed so that difference in height from course prediction lines 91 are expressed by a height of this curtain or wall. In a case where the curtain-like or wall-like image is displayed, a road surface beyond the curtain-like or wall-like image is hidden, and therefore it is desirable to use a semi-transparent image so that the road surface beyond the curtain-like or wall-like image can be seen.

Figure 21:
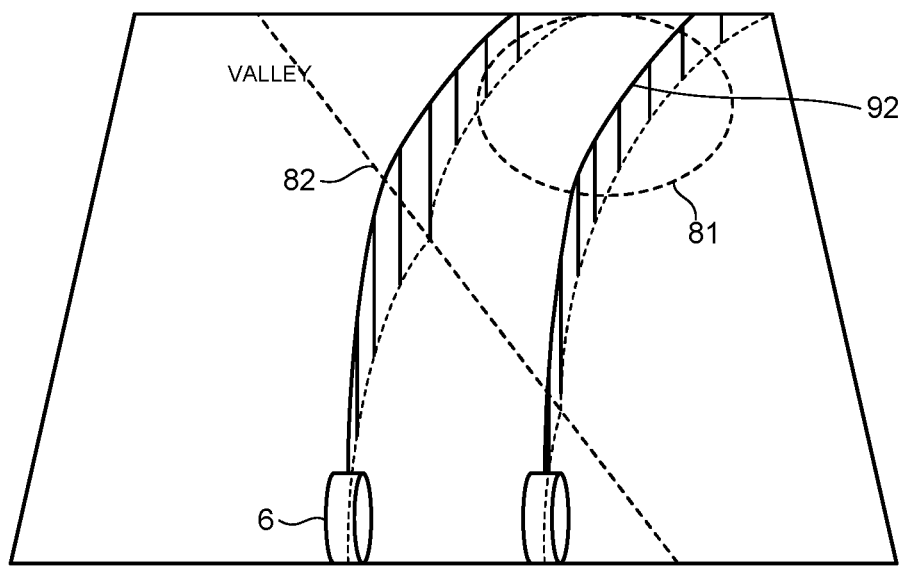
FIG. 21 illustrates another example of a display image for driving assistance in the present embodiment.

FIG. 21 illustrates another example of a display image for driving assistance in the present embodiment. Although an example in which course prediction lines 91 extend from the contact points of wheels 6 is illustrated in the example of FIG. 20, a straight line extending from course prediction lines 91 to the ground is extremely short in a place where a difference in height between course prediction lines 91 and the ground is small. In such a case, also in a case where the curtain-like or wall-like image is displayed, a width of the image is narrow, and the image looks as if the image is interrupted in the middle.

In view of this, the reference plane used as a height reference may be set higher than the road surface and the slope so that course prediction lines 92 pass a position higher than the road surface and the slope. In FIG. 21, the display image is an oblique overhead image showing surroundings of a vehicle viewed from a virtual point of view obliquely above the vehicle, and a pair of course prediction lines, a pair of course prediction projected lines, and lines connecting the course prediction lines and the course prediction projected lines are superimposed as an additional image onto the display image. In FIG. 21, a plane including upper ends of wheels 6 is set as the reference plane, and course prediction lines 92 extend from the upper ends of wheels 6. By thus setting the reference plane (course prediction lines 92) high, the straight lines or the curtain-like or wall-like image is made large and is therefore easier to see than in a case where the straight lines or the curtain-like or wall-like image is small.

The height given to the reference plane, that is, the height given to course prediction lines 92 may be set to any height. For example, the height of course prediction lines 92 may be a height based on wheels 6 as in FIGS. 20 and 21 or may be a height obtained by adding a predetermined value to a height of a highest point of a road surface on a prediction course. In this case, the straight lines or the curtain or wall always stands upward from the ground. Although the reference plane is horizontal and the course prediction lines extend horizontally in FIGS. 20 and 21, the reference plane may be tilted. For example, in a case where contact plane 7 is used as the reference plane, the course prediction lines are below the ground beyond valley 82, and the straight lines or the curtain or wall rises above the course prediction lines so that how the terrain beyond valley 82 rises with respect to the contact plane is expressed.

Figure 22:
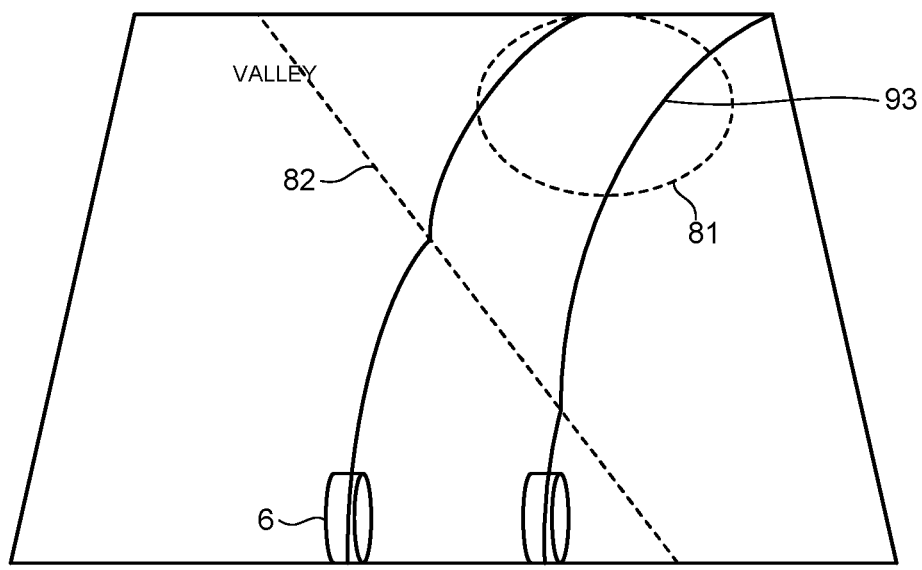
FIG. 22 illustrates another example of a display image for driving assistance in the present embodiment.

FIG. 22 illustrates another example of the display image for driving assistance in the present embodiment. In FIG. 22, the display image is an oblique overhead image showing surroundings of a vehicle viewed from a virtual point of view obliquely above the vehicle, and a pair of course prediction lines extend on a road surface or a slope are superimposed as an additional image onto the display image. Although an example in which course prediction lines 91 and 92 extend on the reference plane is illustrated in FIGS. 20 and 21, course prediction lines 93 may be drawn as lines on the road surface or the slope so that unevenness of the ground (the road surface or the slope) can be grasped from curvature of course prediction lines 93 that undulate in accordance with the unevenness, as illustrated in FIG. 22.

Since course prediction lines 93 in FIG. 22 are identical to the course prediction projected lines in FIG. 20, course prediction lines 93 in FIG. 22 need just be generated by a method identical to a method for generating the course prediction projected lines in FIG. 20. In a case where only course prediction lines 93 on the road surface obliquely viewed from above are displayed as in FIG. 22, a ground image is not hidden by straight lines or a curtain-like or wall-like image, and it is therefore easier to see the ground.

Figure 23A:
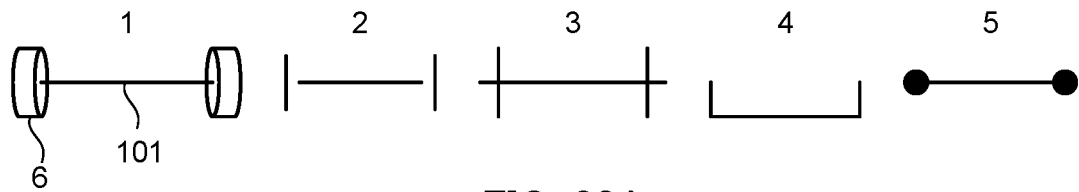
FIGS. 23A to 23C illustrate another example of a display image for driving assistance in the present embodiment.
Figure 23B:
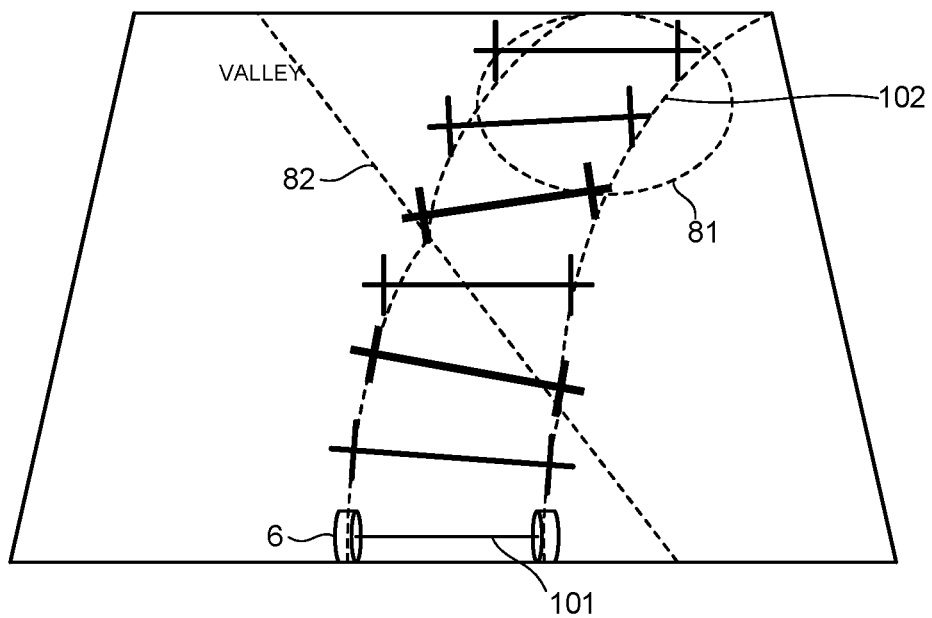
Figure 23C:
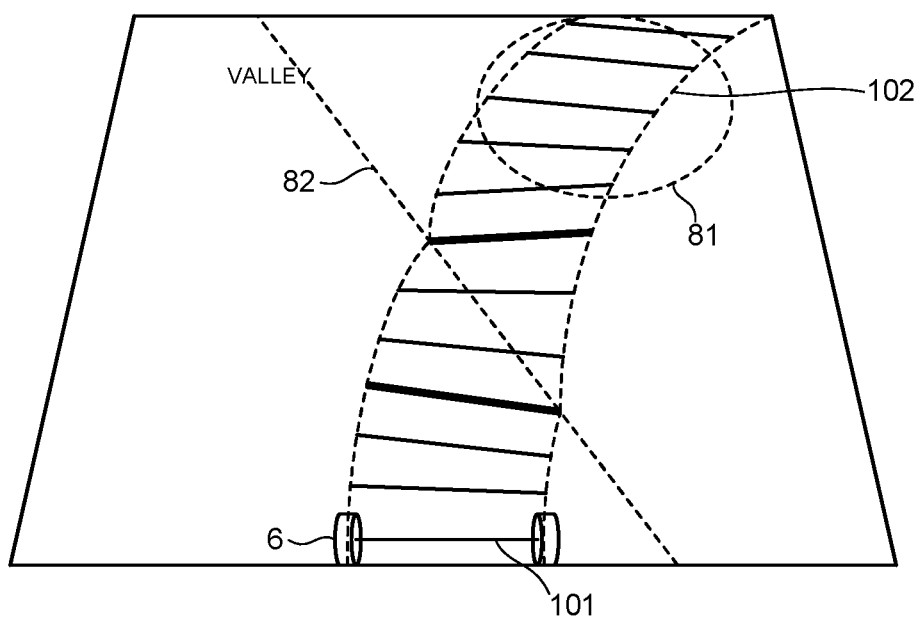

FIGS. 23A to 23C illustrate another example of the display image for driving assistance in the present embodiment. The display images of FIGS. 23B and 23C are oblique overhead images showing surroundings of a vehicle viewed from a virtual point of view obliquely above the vehicle as in FIG. 22, and course prediction lines 102 superimposed as an additional image on the display image correspond to course prediction lines 93 of FIG. 22. In FIG. 23B, model images (1 and 5 in FIG. 23A) that evoke the pair of wheels 6 connected by axle 101 or line images (2 to 4 in FIG. 23A) including a horizontal line and vertical lines added close to both ends of the horizontal line (see FIG. 23A) are displayed on course prediction lines 102 in addition to the additional image.

In FIG. 23C, connection lines or connection planes connecting the pair of course prediction lines 102 are added to the additional image. Inclinations of the model images or line images in FIG. 23B or the connection lines or connection planes in FIG. 23C correspond to differences in height between the pair of course prediction lines at positions where the model images or line images in FIG. 23B or the connection lines or connection planes in FIG. 23C are added. That is, it can be said that a risk of a course determined by a current steering angle is expressed by displaying a predicted inclination of axle 101 connecting wheels 6 during passage of wheels 6 on course prediction lines 102 determined by the steering angle. Since the displayed inclination of axle 101 corresponds to an inclination of the vehicle body, the driver may recognize, for example, from the display image that the vehicle body is inclined leftward or rightward when crossing a valley and change the course so as to avoid the valley.

An image that evokes wheels 6 and axle 101 may be a simplified image of wheels 6 and axle 101 such as 1 in FIG. 23A or may be a more simplified line image such as 2 to 4. Each of line images 2 to 4 is a combination of short lines modeling after wheels 6 and a long line modeling after axle 101. The long line and the short lines may be separated from each other as in 2 or may cross each other as in 3 or may be asymmetrical in an up-down direction as in 4. Alternatively, a mark may be added to both ends of a line as in 5 so that association with wheels 6 and axle 101 is evoked. By drawing such an image in a traveling direction of the vehicle, it is possible to grasp that the image expresses an inclination of the body vehicle.

FIG. 23B illustrates an example in which images modeling after wheels 6 and axle 101 are superimposed on an oblique overhead image. In FIG. 23B, an image of wheels 6 and axle 101 close to real ones as 1 in FIG. 23A is placed at a current position of wheels 6, and simplified line images are used as images on a predicted course. Even in a case where such simplified line images are used, it is easy to imagine that the line images are images modeling after wheels 6 and axle 101 due to continuity with the image of wheels 6 and axle 101 close to real ones such as 1 in FIG. 23A.

In a case where the image of wheels 6 is semi-transparent, it is easier to view a road surface immediately ahead of the wheels. In a case where the image of the wheels and axle is simplified to a line image, an area of an image of a forward region hidden by the image is small, and it is therefore easy to view the image of the forward region. The line image may also be drawn as a semi-transparent image to improve viewability of the forward region. Note that in a portion where the inclination of axle 101 is large, it is desirable to change a display form to alert the driver. For example, a color or thickness of the lines may be changed or a length of lines at both ends or a shape of a mark may be changed.

As illustrated in FIG. 23C, left and right course prediction lines 102 may be connected by lines so that inclinations of the lines correspond to inclinations of the road surface. In FIG. 23C, an image of wheels 6 and axle 101 close to real ones such 1 in FIG. 23A is placed at a current position of wheels 6, and images on the predicted course are simplified as connection lines connecting the pair of course prediction lines 102. Even in a case where the images are simplified to such connection lines, it is easy to imagine that the connection lines represent axle 101 due to continuity with the image modeling after wheels 6 and axle 101.

The connection lines may be displayed in a different manner in a portion where the inclination is large. Furthermore, a mark may be added to both ends of the connection lines as in 4 and 5 in FIG. 23A. Furthermore, a semi-transparent color may be added between left and right course prediction lines 102, and the color may be varied depending on an inclination in a left-right direction or a gradient in a front-rear direction.

Figure 24A:
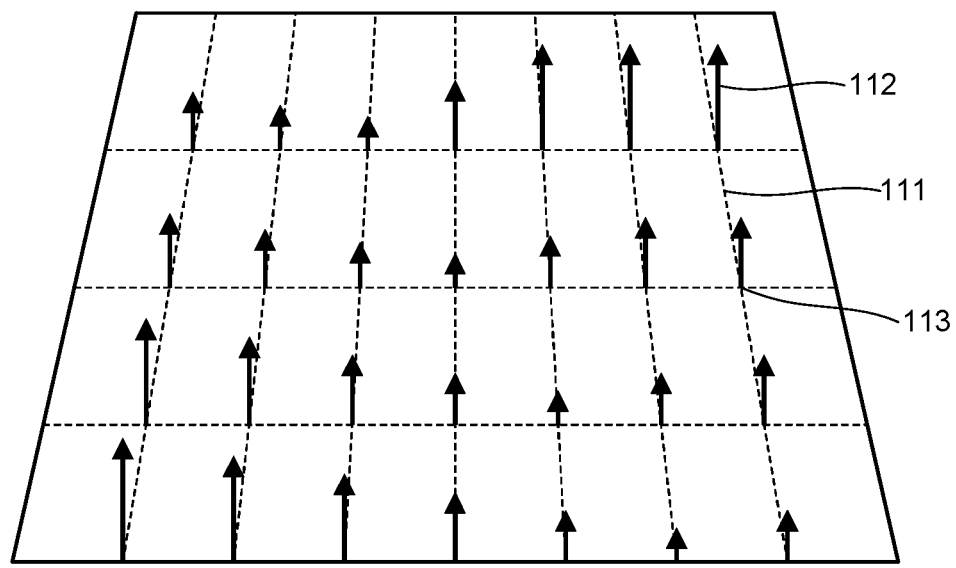
FIGS. 24A and 24B illustrate an example in which heights of ground are expressed by a grid and arrows in the present embodiment.
Figure 24B:
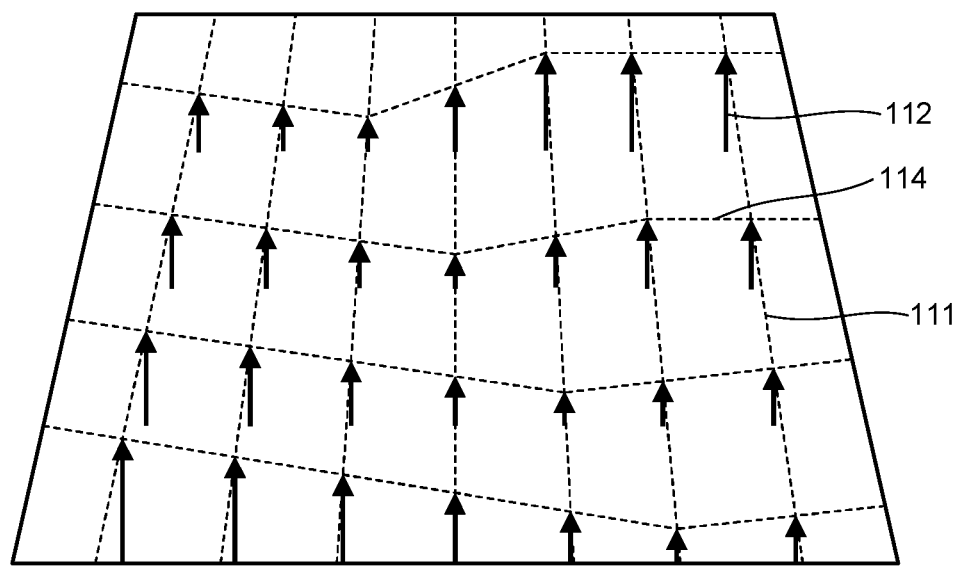

FIGS. 24A and 24B illustrate an example of an additional image expressing heights of the ground by using grid 111 and arrows 112 in the present embodiment. It can also be said that arrows 112 extending from representative points regularly arranged on a reference plane used as a height reference are used as an additional image. In FIG. 24A, differences in height between the ground and grid 111 is expressed by lengths of arrows 112 connecting grid points 113 (intersections of vertical and horizontal lines) of the grid and the ground. The vertical lines and the horizontal lines of grid 111 are on a same plane and are drawn at equal intervals.

Grid points 113 are points representing terrain arranged at equal intervals and therefore may be called representative points (sampling points). Such grid-like arrangement in which the points are arranged at equal intervals is an example of regular arrangement. That is, arrows 112 vertically extending from the representative points (intersections of grid 111) that are regularly arranged to the ground (a slope or a road surface) are superimposed as an additional image on a display image, and lengths of arrows 112 correspond to heights of the slope or the road surface at the representative points from the reference plane.

The reference plane on which the representative points are arranged may be parallel with the contact plane of the vehicle or may be parallel with a horizontal plane. For example, in a case where the reference plane is set parallel with the contact plane of the vehicle, inclination information calculated based on the vehicle may be reflected in the additional image as it is. In a case where the reference plane is set parallel with the horizontal plane, it is necessary to specify an inclination of the vehicle with respect to the horizontal surface, correct the inclination information into inclination information based on the horizontal surface taking the specified inclination into consideration, and reflect the corrected inclination information in the additional image. A height of the reference plane may be set to any height. For example, in a case where the reference plane is set at a position slightly lower than a lowest point of the ground ahead, all of arrows 112 indicating heights of the ground point upward. The height of the reference plane may be determined in accordance with another standard.

For example, in a case where grid 111 is set on a plane which contact plane 7 of front wheels 6 pass, upward arrows are displayed at positions where the ground is located above grid 111 and downward arrows are displayed at positions where the ground is located below the grid 111 plane in the example of terrain of FIG. 24A. In this case, the upward arrows and the downward arrows may be displayed in different manners such as different colors.

Connection lines connecting end points of the arrows and/or connection lines connecting start points of the arrows may be added to the additional image or none of these connection lines may be added. FIG. 24A illustrates an example in which connection lines connecting the start points of the arrows are displayed. Alternatively, lines 114 that vertically and horizontally connect the end points (tips) of arrows 112 may be displayed, as illustrated in FIG. 24B. Since the tips of arrows 112 are located on the ground, lines 114 vertically and horizontally connecting the tips of the arrows express a rough shape of the ground. Grid 111 of FIG. 24A may be added to FIG. 24B or only arrows 112 may be displayed without displaying grid 111 of FIG. 24A.

Figure 25:
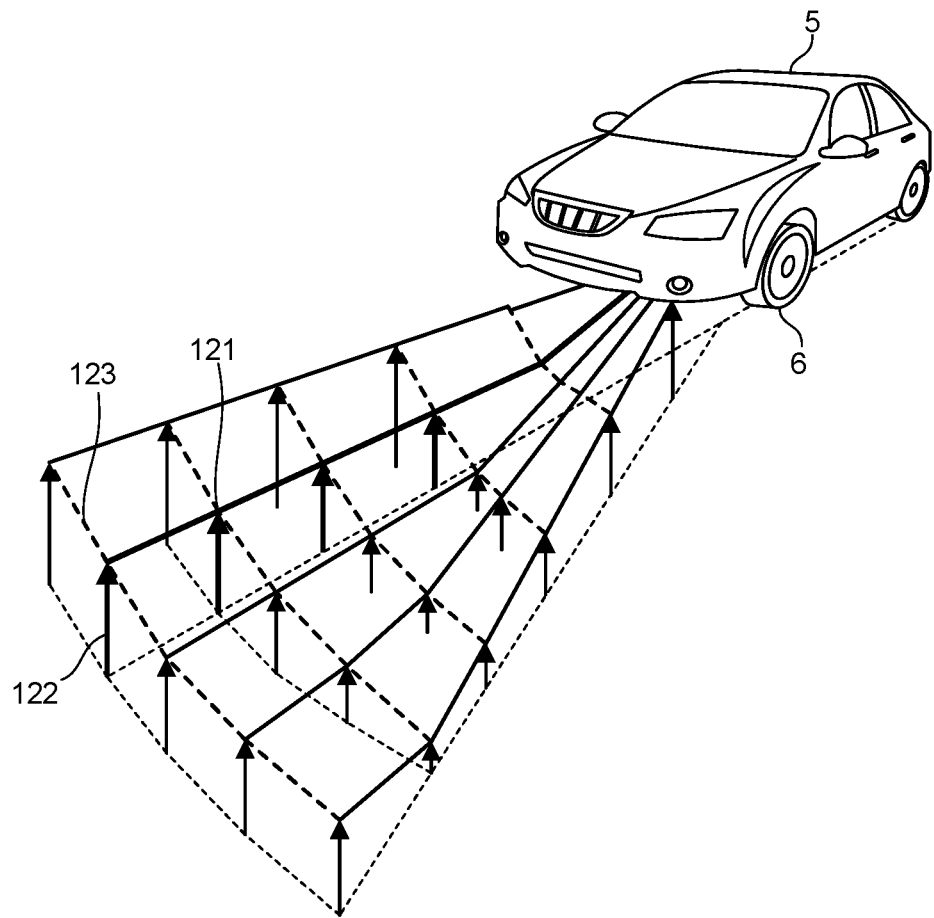
FIG. 25 illustrates a modification of display in which a gradient is expressed by grid points, arrows, and connection lines in the present embodiment.

FIG. 25 illustrates a modification of display expressing a gradient by using grid points 121, arrows 122, and connection lines 123 in the present embodiment. Grid points 121 are not limited to intersections of vertical lines and horizontal lines such as a grid of squares and may be intersections of radial lines and concentric circles. Furthermore, it is unnecessary to place grid points 121 in all directions. For example, such an arrangement is also possible in which arrows or connection lines are added to an additional image in a region corresponding to a course of the vehicle and arrows and connection lines are not added to the additional image in a region that does not correspond to the course, as illustrated in FIG. 25. Display of the radial lines and/or the concentric circles may be omitted or only some of the lines passing grid points 121 may be displayed as illustrated in FIG. 25.

In a case where grid points 121 are arranged along the radial lines, connection lines 123 that connect tips of arrows 122 extending from grid points 121 may be displayed so that connection lines connecting the tips of arrows 122 in a radial direction and connection lines connecting the tips of arrows 122 in a circumferential direction are displayed in different manners or only the former connection lines or latter connection lines are displayed. Some arrows 122 may be omitted or all arrows 122 may be omitted instead of displaying arrows 122 at all grid points 121.

A display manner or display range may be changed in accordance with a steering angle. For example, a connection line extending in a direction closest to a course determined in accordance with a steering angle may be displayed in a different color or width or a direction in which grid points 121 are arranged may be changed in accordance with the steering angle or lines passing arrows 122 and grid points 121 may be displayed only at positions close to the course in accordance with the steering angle. The limitation of the arrangement of grid points 121, partial omission of display, and change of manners according to a steering angle described above may also be applied to a case where the grid points are intersections of vertical lines and horizontal lines such as a grid of squares.

Figure 26:
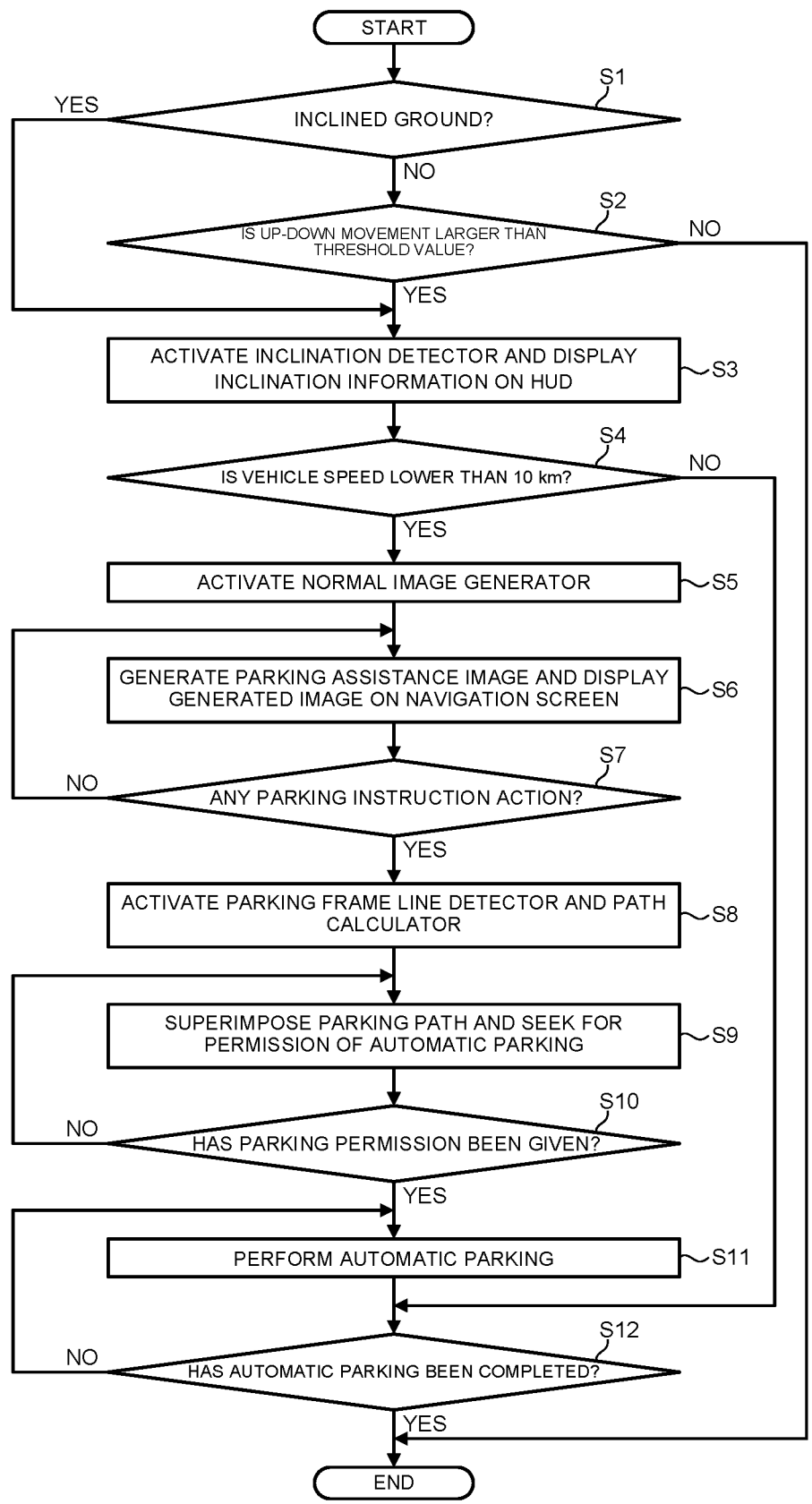
FIG. 26 is a flowchart illustrating control of image processing in the driving assistance system.

Next, control of image processing in the driving assistance system is described. FIG. 26 is a flowchart illustrating control of image processing in the driving assistance system. In driving assistance apparatus 17, state manager 31 determines a scene on the basis of information acquired from navigation apparatus 19 and vehicle control apparatus 16 and controls each section in the system in accordance with the scene.

For example, it is determined whether or not the scene is an inclined ground traveling scene where vehicle 5 travels on inclined ground on the basis of a detection result of a clinometer provided in vehicle 5 or an acceleration sensor provided in navigation apparatus 19 (step S1). In a case where an inclination angle of vehicle 5 is large (step S1, YES), it is determined that the scene is the inclined ground traveling scene, and the flow shifts to step S3, in which inclination detector 47 is activated. For example, in a case where vehicle 5 is traveling on a plain field and the inclination angle of vehicle 5 is small, it is determined that the scene is not the inclined ground traveling scene (step S1, NO), and the flow shifts to step S2.

In step S2, it is determined whether or not the scene is off-road traveling scene on the basis of up-down movement of vehicle 5. For example, in a case where vehicle 5 is traveling off-road or traveling on a rough road even while traveling on a plan field and large up-down movement is continuously detected (step S2, YES), it is determined that the scene is the off-road traveling scene, and the flow shifts to step S3, in which inclination detector 47 is activated.

Note that the off-road traveling scene may be included in the inclined ground traveling scene without distinguishing the off-road traveling scene from the inclined ground traveling scene since the same processing is performed in step S3 and subsequent steps. In a case where the scene is not the inclined ground traveling scene (step S2, NO), the flow is ended without activating inclination detector 47. That is, in a case where the scene is not the inclined ground traveling scene, electric power is not consumed for inclination detection.

In the inclined ground traveling scene, inclination detector 47 is activated, and driving is assisted by displaying obtained inclination information by an HUD (step S3). Next, it is determined whether or not to perform parking assistance. In a case where a vehicle speed is less than 10 km (step S4, YES), it is estimated that the driver has an intention to park vehicle 5, normal image generator 48 is activated (step S5), and a parking assistance image is generated and displayed on a screen of the navigation apparatus (step S6). The parking assistance image may be, for example, an image showing a candidate for a space where vehicle 5 can be parked (parking space candidate) and inclination information of the parking space candidate. Note that the parking space candidate may be detected after a next parking instruction action.

When the parking instruction action is detected (step S7, YES), parking frame line detection and parking path calculation are performed in response to the parking instruction action (step S8). For example, it may be determined that the parking instruction action has been performed in a case where both of stoppage of vehicle 5 and turning on of hazard lights are detected.

In a case where a steering wheel is turned before or after the stoppage, it may be determined that an instruction to park vehicle 5 in a parking space candidate located in a direction opposite to a direction in which the steering wheel has been turned. When one of parking space candidates displayed in the parking assistance image is touched, it may be determined that an instruction to park vehicle 5 in this space has been given. In a case where the parking instruction action is not detected (step S7, NO), the flow returns to (step S6), in which the parking assistance image continues to be displayed.

In step S8, parking frame line detector 49 detects a parking space around vehicle 5, especially in a direction indicated by the parking instruction action. In a case where parking space candidates are detected in the stage of generation of the parking assistance image, it is only necessary to select a parking space corresponding to the indicated direction from among the candidates. Parking frame line detector 49 detects a parking frame line if any and detects a parking space candidate in a case where no parking frame line is present, and therefore the parking space need not have a parking frame line.

Specifically, in a case where a line that can be regarded as a parking frame line is not detected, a region where an inclination is almost constant and no three-dimensional object is present is detected as a parking space candidate, and in a case where the vehicle can be parked in this region, a target parking position is set in this region. In a case where the parking space has a parking frame line, one region surrounded by a parking frame line is selected and set as a target parking position. Path calculator 33 calculates a parking path from the position of the vehicle to the set target parking position, superimposes the target parking position and the parking path on a normal image, and seeks for determination as to whether or not to perform automatic parking (step S9).

In a case where a plurality of parking space candidates or a plurality of parking frames are detected, a plurality of target parking positions may be displayed, and path calculator 33 may seek for not only the determination as to whether or not to perform automatic parking, but also selection of a target parking position. Alternatively, only one target parking position may be displayed, and in a case where execution of automatic parking is not permitted (step S10, NO), permission may be sought by displaying a next target parking position (step S9).

In a case where a target parking position where the vehicle is to be parked is specified and execution of automatic parking is permitted (step S10, YES), vehicle control apparatus 16 is given a command to switch to an automatic driving mode. Furthermore, driving controller 34 is given an instruction to perform automatic parking so that the vehicle travels to the target parking position by passing the parking path set by path calculator 33 (step S11). This is continued until the automatic parking is completed (step S12, NO).

When the automatic parking is completed (step S12, YES), this flow ends. This flow also ends in a case where it is determined that the scene is not the inclined ground traveling scene (step S2, NO), but this flow may be periodically activated so as to function when vehicle 5 reaches inclined ground. In a case where the vehicle speed is 10 km or more (step S4, NO), it is determined whether the automatic parking is completed (step S12).

Upon driver's selection of the off-road traveling mode or upon receipt of an instruction to perform automatic parking, it may be determined that the scene is the inclined ground traveling scene irrespective of scene determined by state manager 31 or a normal image may be displayed or the automatic parking function may be activated. In a case where a destination is set in navigation apparatus 19, inclination detection may be started on a condition that vehicle 5 has approached the destination, and parking frame line detection may be started on a condition that hazard lights have been turned on in the vicinity of the destination.

The disclosure of Japanese Patent Application No. 2023-046961 filed on Mar. 23, 2023 including the specification, drawings and abstract is incorporated herein by reference in its entirety.

INDUSTRIAL APPLICABILITY

The technique of the present disclosure is widely applicable to a driving assistance apparatus that makes it possible to correctly estimate an inclination angle of a slope inclined in any direction and perform more accurate automatic parking by performing inclination direction estimation in which an inclination direction is estimated by analyzing a movement amount of a feature point on an image caused by traveling and then performing inclination angle estimation.

REFERENCE SIGNS LIST

1 Slope
2 Inclination angle
3 Inclination direction
4 Boundary line
5 Vehicle
6 Wheel
7 Contact plane
8 Contour line
11 Camera
15 Operating apparatus
16 Vehicle control apparatus
17 Driving assistance apparatus
18 HMI apparatus
19 Navigation apparatus
21 Driving assistance system
32 Image processor
45 Inclination direction estimator 47 Inclination detector
61 Side mirror
80 Panel
81 Flat portion
82 Valley
83 Head-up display
84 Arrow
91 Course prediction line
101 Axle
111 Grid
113 Grid point

What is claimed is:

1. A driving assistance apparatus, comprising:
an input configured to be coupled with a camera mounted on a vehicle; and
an inclination detector that detects an inclination direction of a slope or a road surface around the vehicle based on a camera image of surroundings of the vehicle taken by the camera mounted on the vehicle, wherein
the inclination detector includes:
an overhead image generator that generates an overhead image from the camera image while using a contact plane of the vehicle as a projection plane;
a feature point detector that detects one or more feature points from the overhead image;
a movement amount calculator that calculates motion parallax of the one or more feature points caused by movement of the vehicle;
a coordinate calculator that calculates three-dimensional coordinates of the one or more feature points from the motion parallax;
an inclination direction estimator that estimates the inclination direction of the slope or the road surface that has an inclination different from the contact plane of the vehicle, based on a distribution of the three-dimensional coordinates of the one or more feature points; and
an inclination angle estimator that finds an inclination angle based on the inclination direction and the distribution, and
driving of the vehicle is assisted based on the inclination direction.

2. The driving assistance apparatus according to claim 1, further comprising a display image generator that assists the driving of the vehicle by generating a display image of the surroundings of the vehicle viewed from above based on the inclination direction.

3. The driving assistance apparatus according to claim 2, wherein
the display image is an oblique overhead image of surroundings of the vehicle viewed from a virtual point of view obliquely above the vehicle, and an arrow extending from representative points regularly arranged on a reference plane are superimposed as an additional image on the display image, and
a length of the arrow corresponds to a height of the slope or the road surface at the representative points.

4. The driving assistance apparatus according to claim 3, wherein
a connection line that connects end points of a plurality of the arrows with each other and/or a connection line that connects start points of a plurality of the arrows with each other are/is added to the additional image.

5. The driving assistance apparatus according to claim 4, wherein
the plurality of arrows or the connection line are/is added to the additional image in a region that corresponds to a course of the vehicle, and the plurality of arrows or the connection line are/is not added to the additional image in a region that does not correspond to the course thereof.

6. The driving assistance apparatus according to claim 2, wherein
the display image is an oblique overhead image of surroundings of the vehicle viewed from a virtual point of view obliquely above the vehicle, and a pair of course prediction lines extending on a reference plane and lines or planes that connect the road surface or the slope and the pair of course prediction lines and are perpendicular to the reference plane are superimposed as an additional image on the display image.

7. The driving assistance apparatus according to claim 2, wherein
the display image is an oblique overhead image of surroundings of the vehicle viewed from a virtual point of view obliquely above the vehicle, and a pair of course prediction lines extending on the road surface or the slope are superimposed as an additional image on the display image.

8. The driving assistance apparatus according to claim 7, wherein
a model image modeling after a pair of wheels connected by an axle, a line image including a horizontal line and vertical lines added close to both ends of the horizontal line, or connection lines or connection planes that connect the pair of course prediction lines are superimposed on the display image in addition to the pair of course prediction lines.

9. The driving assistance apparatus according to claim 2, wherein
the display image is an overhead image of surroundings of the vehicle viewed from a virtual point of view above the vehicle or obliquely above the vehicle, and a plurality of arrows are superimposed as an additional image on the display image,
a direction of at least one of the plurality of arrows corresponds to an inclination direction at a position where the at least one of the plurality of arrows is added,
a dimension or color of at least one of the plurality of arrows corresponds to an inclination angle at a position where the at least one of the plurality of arrows is added, and
the dimension of the at least one of the plurality of arrows is a length, a line thickness, or a size of the at least one of the plurality of arrows.

10. The driving assistance apparatus according to claim 9, wherein
at least one of the plurality of arrows is placed along a contour line connecting positions at a same height.

11. The driving assistance apparatus according to claim 3, wherein
the reference plane is parallel with a contact plane of the vehicle or a horizontal plane.

12. The driving assistance apparatus according to claim 1, wherein
the inclination direction estimator sets a plurality of estimation directions, performs, for each of the plurality of estimation directions, processing including performing linear approximation of a feature point distribution on a two-dimensional plane whose first axis is a distance component to a feature point in the estimation direction and whose second axis is a height of the feature point and finding dispersion in the linear approximation, and estimates an estimation direction in which the dispersion is minimum, as the inclination direction.

13. The driving assistance apparatus according to claim 1, further comprising an input section that receives external information,
wherein the inclination direction is estimated by using the external information.

14. The driving assistance apparatus according to claim 1, wherein
the one or more feature points are classified based on colors, heights, positions on a plane, or the distribution of three-dimensional coordinates of the one or more feature points, and the inclination direction or the inclination angle is estimated based on the one or more feature points thus classified.

15. The driving assistance apparatus according to claim 1, wherein
a region suitable for parking is detected based on a color, a height, a position on a plane, or the distribution of three-dimensional coordinates of the one or more feature points.

16. The driving assistance apparatus according to claim 1, further comprising a normal image generator that generates a normal image of the road surface and the slope viewed from above,
wherein a projection plane of projective transformation for generating the normal image is set based on the inclination direction.

17. The driving assistance apparatus according to claim 16, wherein
the projective transformation is performed by using a mapping table corresponding to the inclination direction and the inclination angle; and
a mapping table for a portion where the inclination direction or the inclination angle changes from one to another is generated by blending one mapping table and another mapping table.

18. A driving assistance method, comprising:
imaging surroundings of a vehicle by using a camera mounted on the vehicle;
generating an overhead image from the camera image while using a contact plane of the vehicle as a projection plane;
detecting one or more feature points from the overhead image;
calculating motion parallax of the one or more feature points caused by movement of the vehicle;
calculating three-dimensional coordinates of the one or more feature points from the motion parallax;
estimating an inclination direction of a slope or a road surface that has an inclination different from the contact plane of the vehicle, based on a distribution of the three-dimensional coordinates of the one or more feature points;
finding an inclination angle based on the inclination direction and the distribution; and
assisting driving of the vehicle based on the inclination direction.

* * * * *